United States Patent [19]
Sato et al.

[11] Patent Number: 5,694,030
[45] Date of Patent: Dec. 2, 1997

[54] MAGNETIC ELEMENT FOR POWER SUPPLY AND DC-TO-DC CONVERTER

[75] Inventors: Toshiro Sato, Yokohama; Kunio Matsukura, Kawasaki; Isamu Yanase, Yokohama; Yuji Iseki, Yokohama; Tetsuhiko Mizoguchi, Yokohama; Yuji Ide, Yokohama; Michio Hasegawa, Yokohama; Yoshihiko Yamaguchi, Urawa; Yasunori Iwamoto, Yokohama, all of Japan

[73] Assignee: Kabushiki Kaisha Toshiba, Kawasaki, Japan

[21] Appl. No.: 714,780

[22] Filed: Sep. 16, 1996

Related U.S. Application Data

[63] Continuation of Ser. No. 212,797, Mar. 15, 1994, Pat. No. 5,583,424.

[30] Foreign Application Priority Data

Mar. 15, 1993 [JP] Japan .......................... 5-80157

[51] Int. Cl.$^6$ .................. G05F 1/40; H01F 5/00
[52] U.S. Cl. .................. 323/282; 323/285; 336/200; 336/232
[58] Field of Search .................. 336/200, 232, 336/65, 105, 221; 361/87; 323/282, 285, 290, 294, 249

[56] References Cited

U.S. PATENT DOCUMENTS

| | | | |
|---|---|---|---|
| 4,346,340 | 8/1982 | Hackett-Jones | 323/249 |
| 4,485,314 | 11/1984 | Turchi | 307/308 |
| 4,535,378 | 8/1985 | Endo | 361/18 |
| 4,829,232 | 5/1989 | Erickson, Jr. | 323/290 |
| 4,959,631 | 9/1990 | Hasegawa et al. | 336/83 |
| 5,245,307 | 9/1993 | Klaus et al. | 336/200 |
| 5,399,958 | 3/1995 | Iyoda | 323/282 |
| 5,583,424 | 12/1996 | Sato et al. | 323/282 |

FOREIGN PATENT DOCUMENTS 5-236642  9/1993  Japan.

OTHER PUBLICATIONS

Hiroshi Sakamoto et al, "DC Current Sensors Using ...", Technical Report of IEICE of Japan, pp. 45–52, 1987.

*Primary Examiner*—Adolf Berhane
*Attorney, Agent, or Firm*—Oblon, Spivak, McClelland, Maier & Neustadt, P.C.

[57] ABSTRACT

Disclosed is a dc-to-dc converter comprising a switching transistor, a pulse-width modulation controller, a sandwich-type planar inductor, which accumulates an electromagnetic energy at ON state and releases the accumulated electromagnetic energy at OFF state of the switching transistor, a smoothing capacitor, a rectifying element, and a planar search coil for detecting an overcurrent flowing the planar coil, disposed on one of the outer surfaces of the soft magnetic layers constituting the planar inductor.

8 Claims, 33 Drawing Sheets

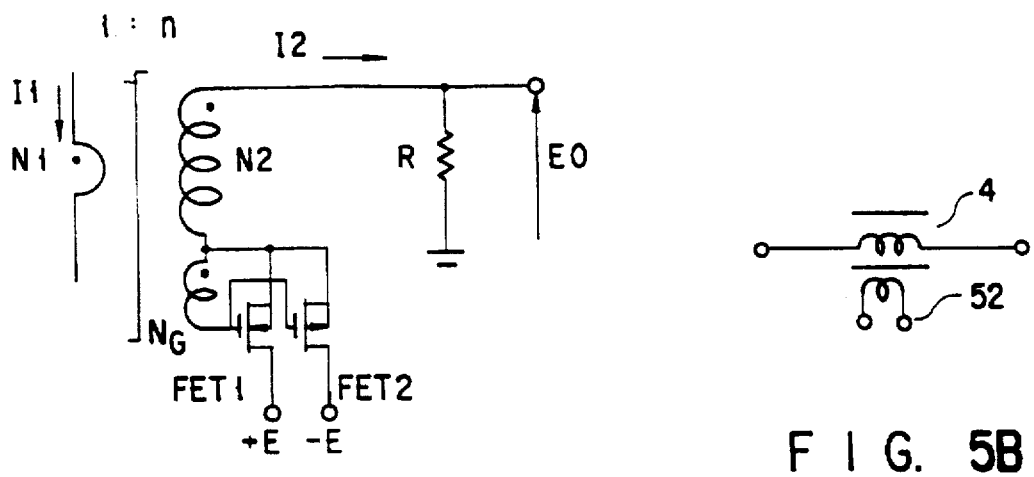
FIG. 4
PRIOR ART
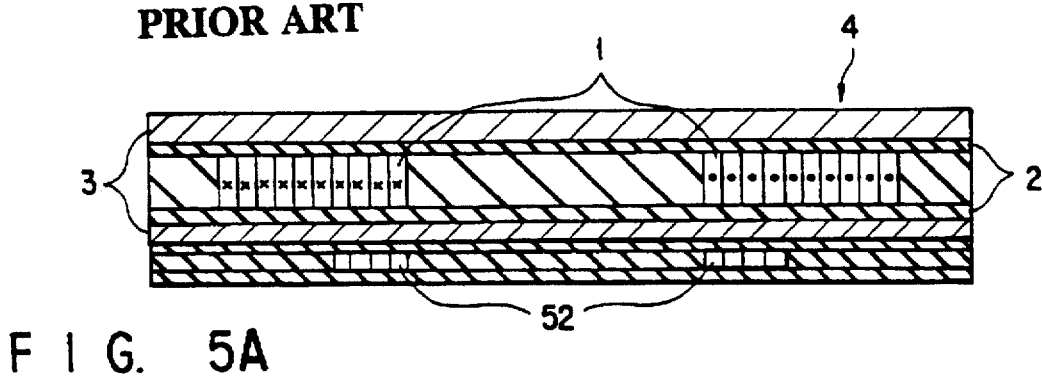
FIG. 5B
FIG. 5A
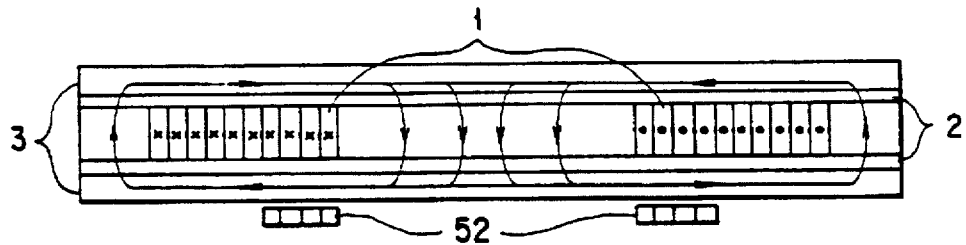
FIG. 7A
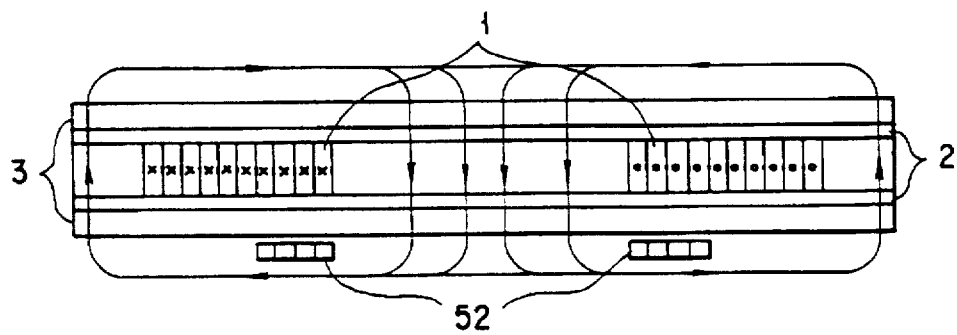
FIG. 7B

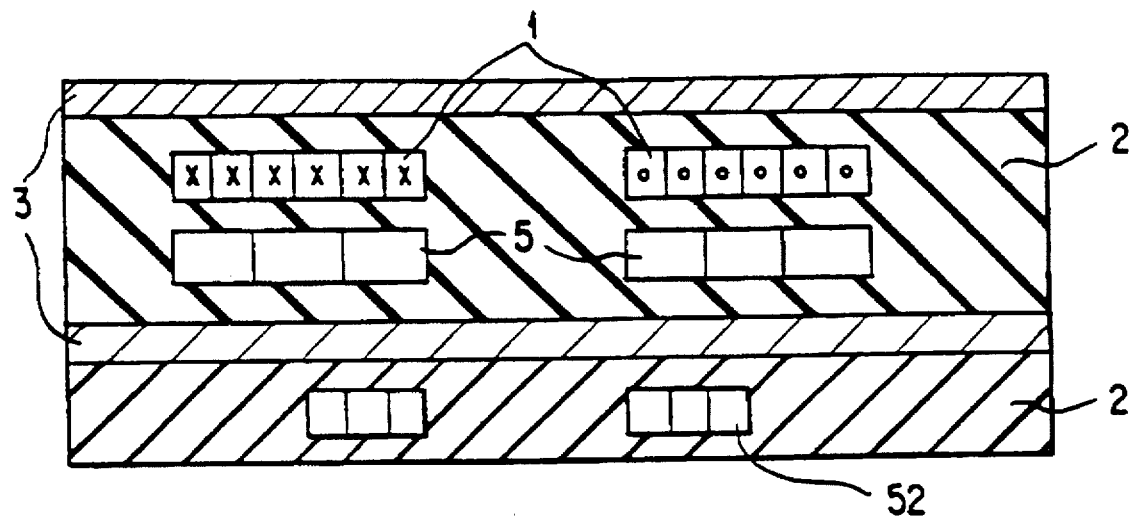
F I G. 6A
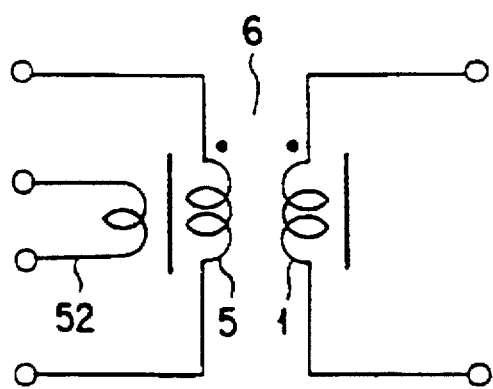
F I G. 6B

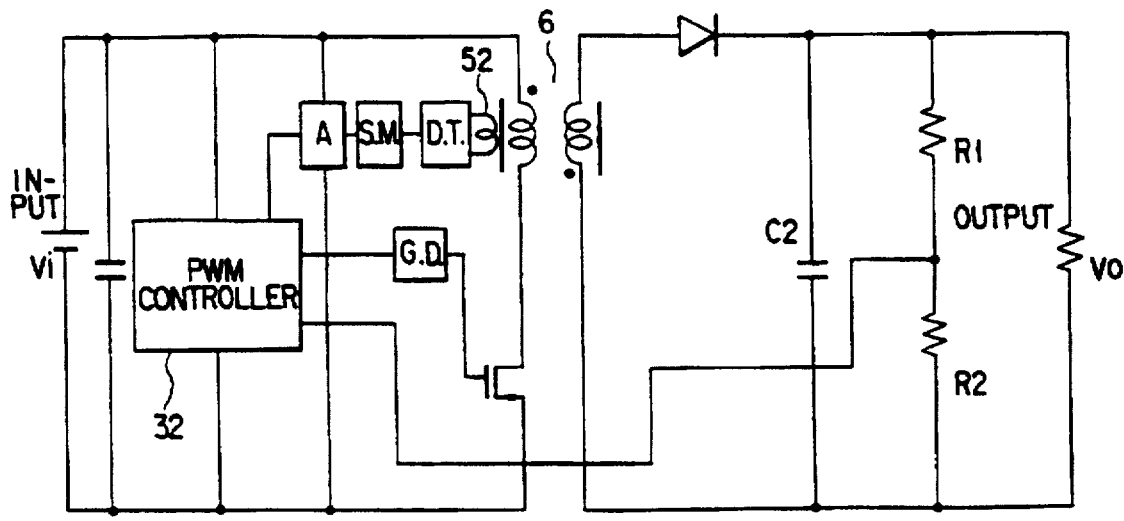
F I G. 9D
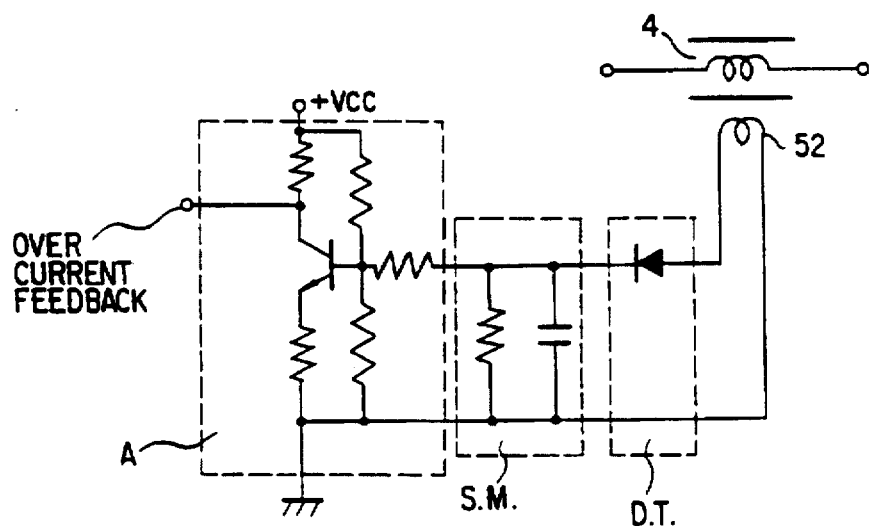
F I G. 9E

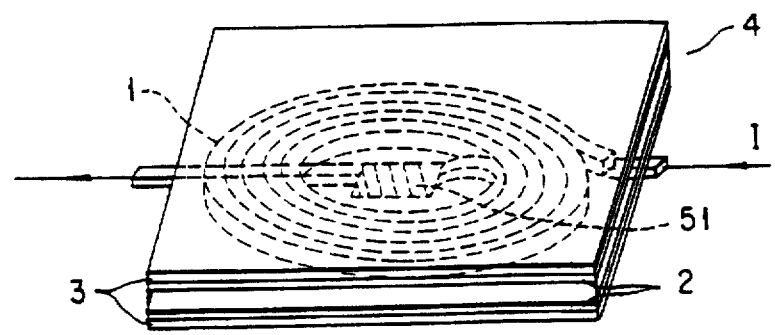
F I G. 12
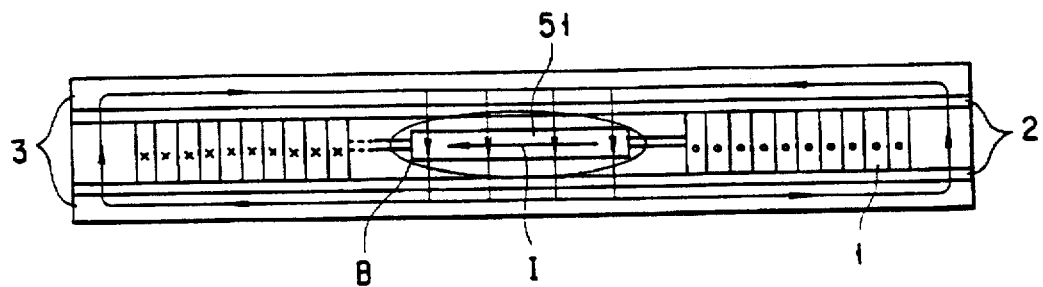
F I G. 13
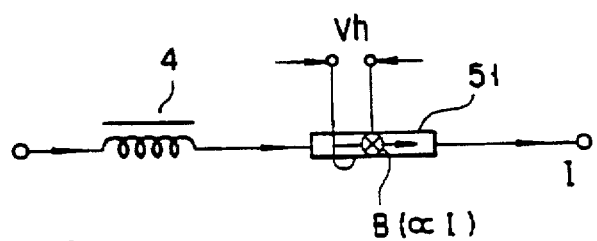
F I G. 14
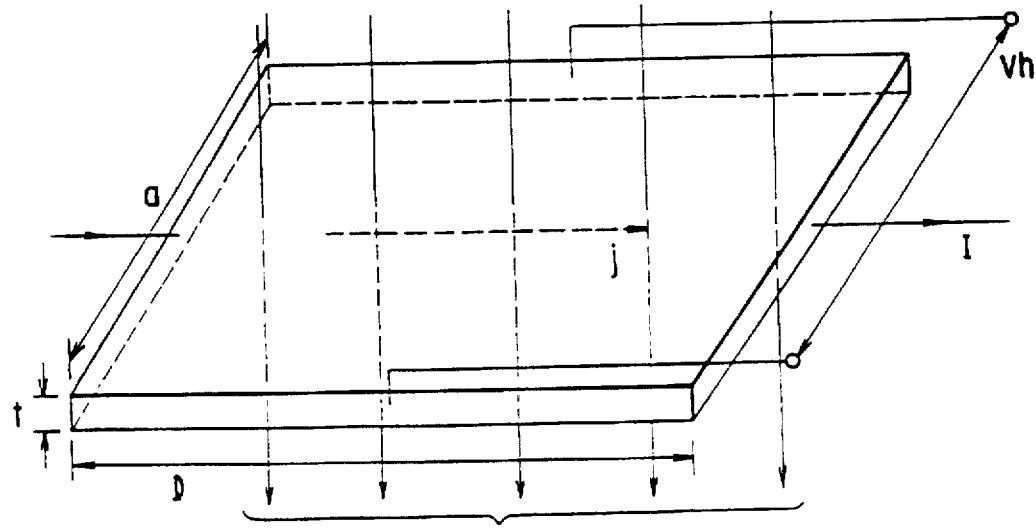
F I G. 15

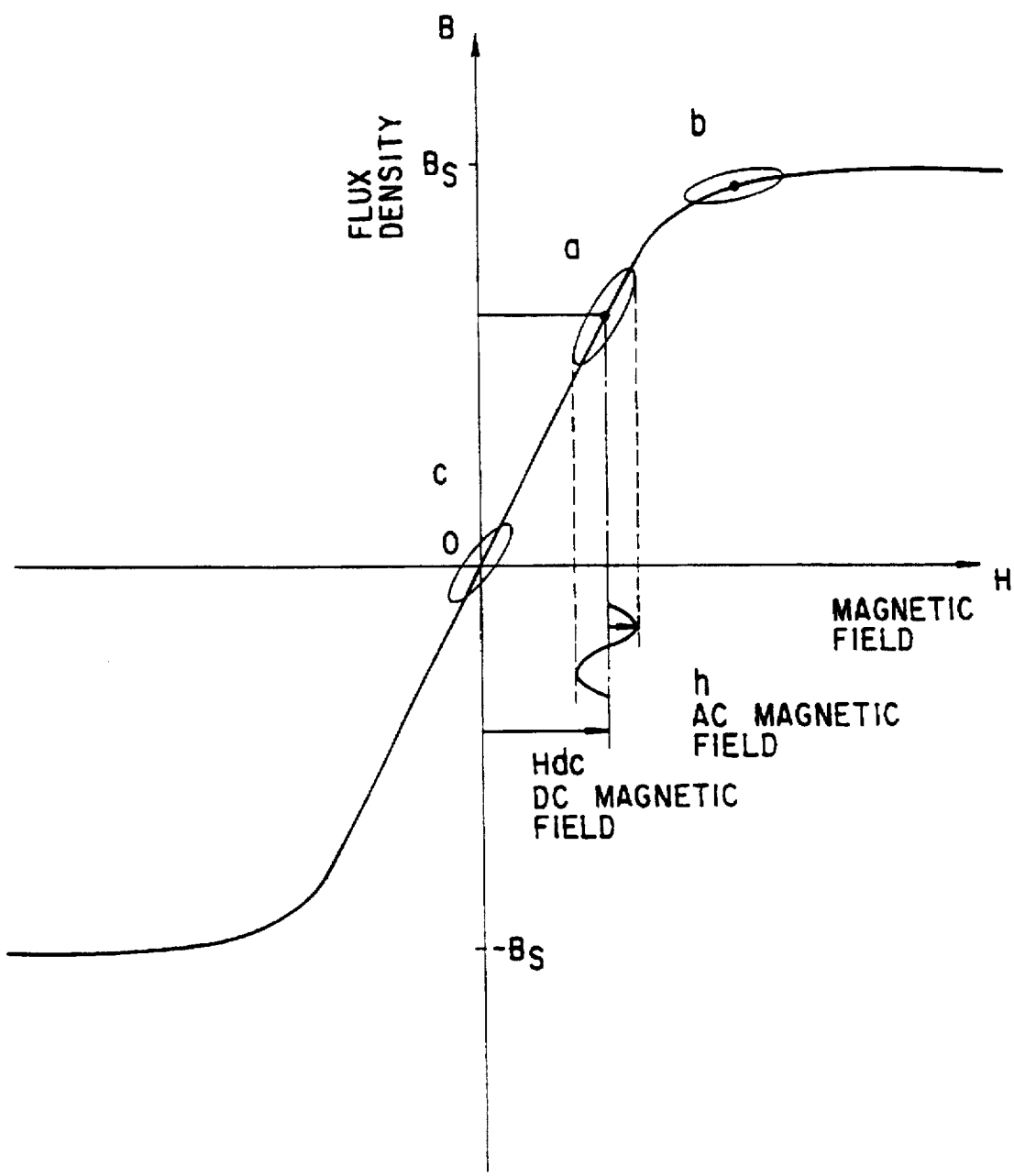
F I G. 18

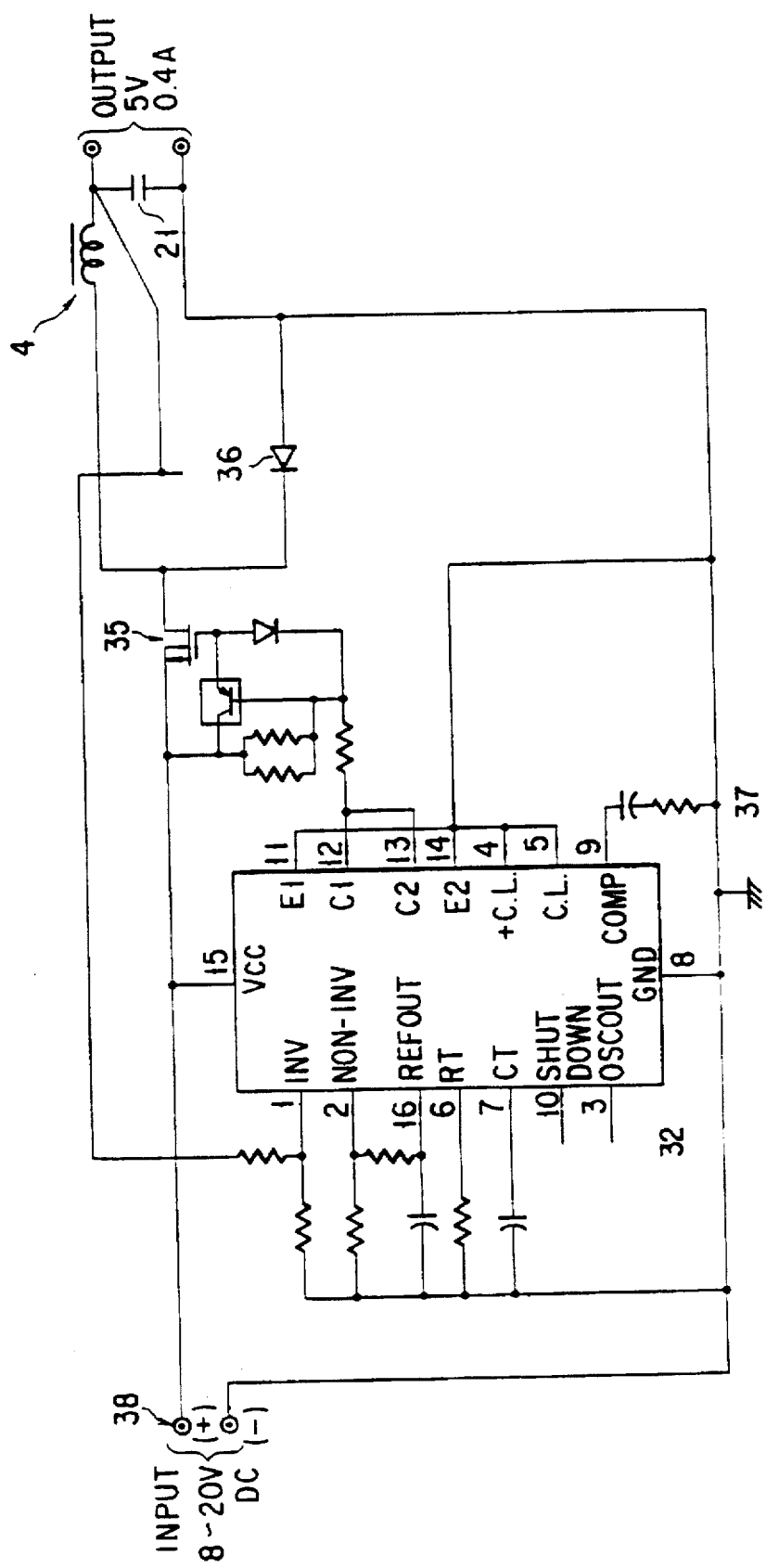
F I G. 35

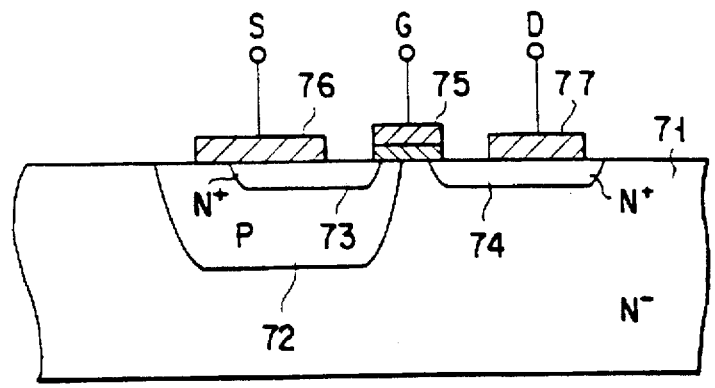
F I G. 41
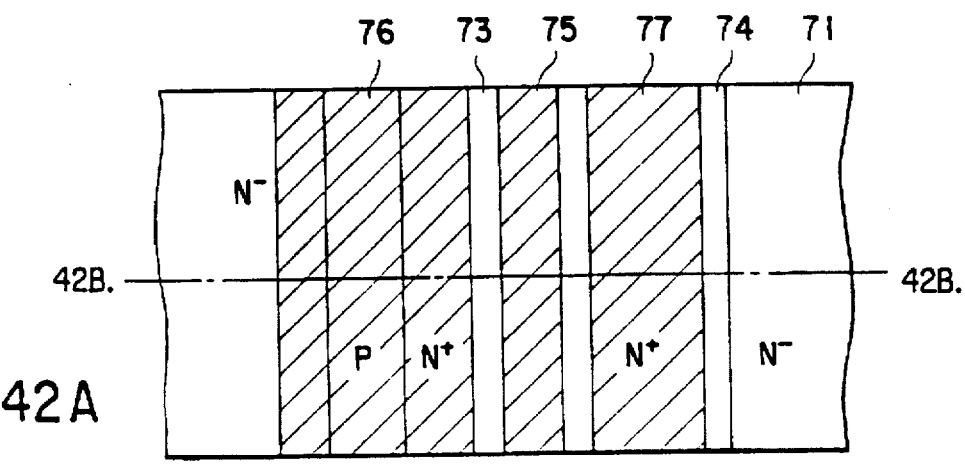
F I G. 42A
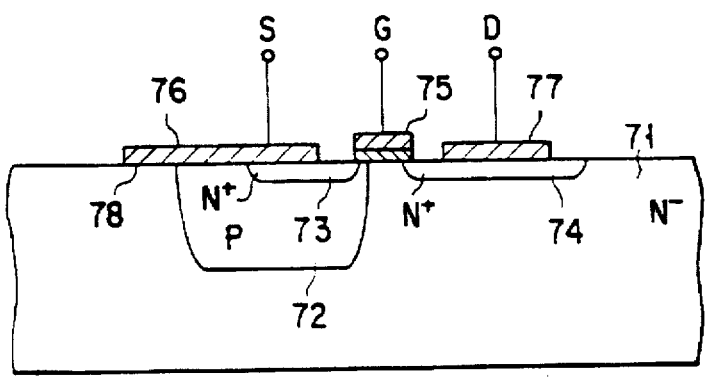
F I G. 42B

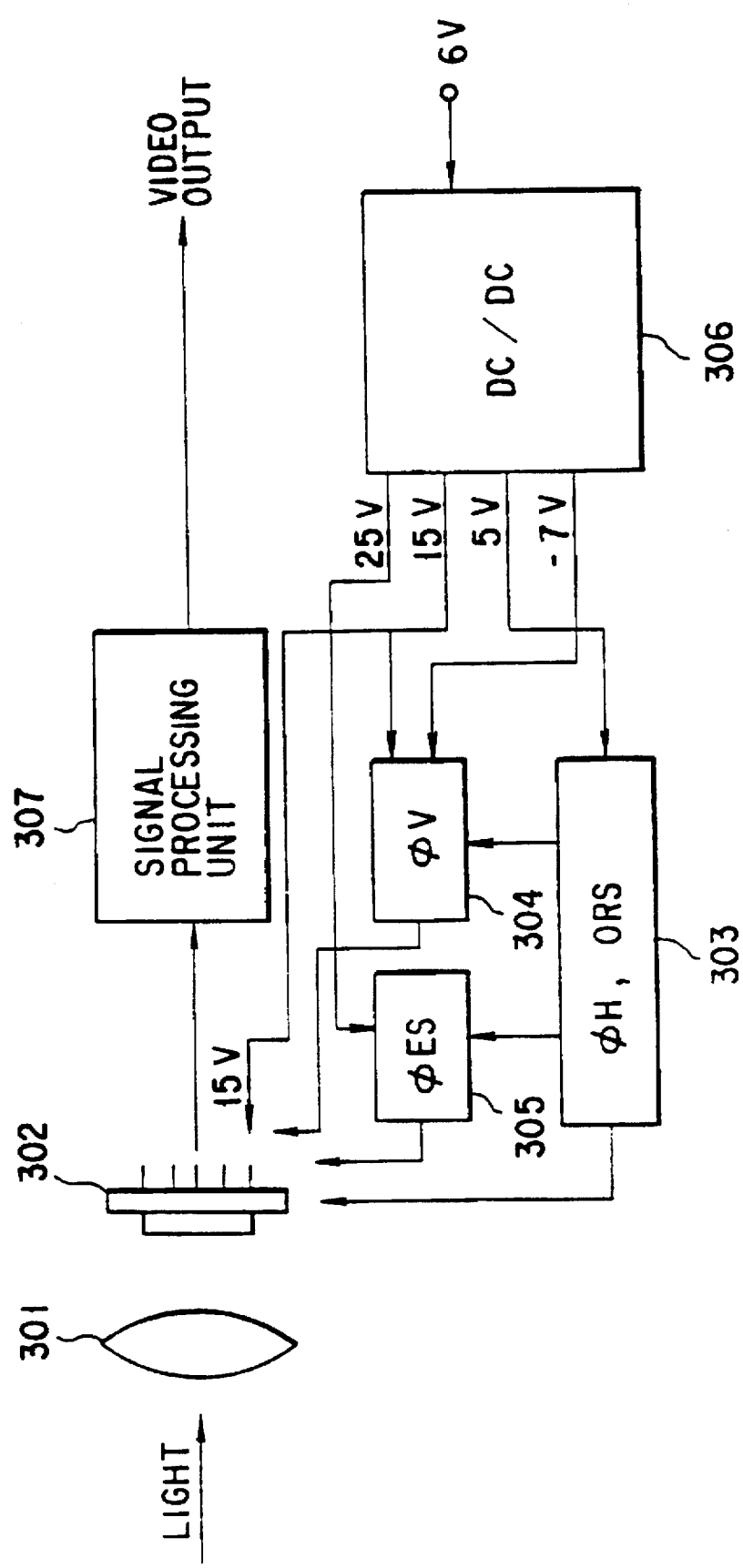
F I G. 56

MAGNETIC ELEMENT FOR POWER SUPPLY AND DC-TO-DC CONVERTER

This is a Continuation, of application Ser. No. 08/212,797 filed Mar. 15, 1994 now U.S. Pat. No. 5,583,424.

BACKGROUND OF THE INVENTION

1. Field of the Invention

The present invention relates to a magnetic element and dc-to-dc converter for use in a power supply in an electronic device such as a personal computer, a portable information device, and an electronic exchanger.

2. Description of the Related Art

In recent years, a more compact, low-profile electronic device represented by a personal computer, a portable information device, or an electronic exchanger has been developed. This can be mainly achieved by one-chip electronic circuits obtained by the high-density integration of semiconductor integrated circuits. However, in such a device, a power supply unit for supplying a power has not been downsized. Therefore, the power supply unit begins to be a large factor which retards downsizing of the device and a decrease in device cost.

At present, a power supply using a switching process is used as a power supply for electronic communication equipment. When different voltages are used in the circuits of an electronic device, a dc-to-dc converter is used. In order to decrease the size and weight of the electronic device, the switching frequency of a switching power supply including the dc-to-dc converter has been gradually increased. That is, if the switching frequency is increased, the entire size of the device can be decreased because passive elements such as magnetic elements (inductor or transformer) and capacitors can be decreased in size. As a result, at present, a power supply which can be used in a several 100 kHz band has been realized. In addition, a power supply having a power density (power per unit volume of power supply) of higher than 1 W/cm$^3$ has been developed.

As a smoothing capacitor of the constituent elements of the dc-to-dc converter, a large-capacitance multilayered ceramic capacitor is developed in place of a conventionally used electrolytic capacitor. Therefore, a compact, low-profile dc-to-dc converter having higher reliability is expected.

On the other hand, in a magnetic element, a planar inductor or transformer is developed to decrease the thickness of the magnetic element. A case wherein the magnetic element is applied to a power supply is reported (e.g., the November 1992 IEICE transactions, T. Sato et al., Vol. E75-B, No. 11, pp. 1186–1191, November 1992). A planar inductor 4, as shown in FIG. 1, has a structure in which a planar coil 1 is sandwiched by amorphous magnetic thin sheets 3 through insulating layers 2, and the planar inductor 4 has a size of 11×11×0.8 mm$^3$. The planar inductor has characteristics, i.e., an inductance of 30 µH and a coil resistance of 0.65Ω, and is used at a frequency of several 100 kHz. When the planar inductor is used, a low-profile power supply can be expected.

FIG. 2 shows a buck (step-down) chopper type dc-to-dc converter. A dc-to-dc converter having an output power of 10 W or less is frequently used. In such a dc-to-dc converter, since a ratio of a non-load loss which is not related to the output power to all losses is high, the efficiency of the dc-to-dc converter is generally about 70%. The non-load loss is generated by a PWM control IC 32 for performing constant-voltage control and its external parts (mainly, resistors and capacitors), a driver circuit (a gate driver circuit in a power MOSFET 35, or a base driver circuit in a bipolar power transistor) for a main switching element, and an overcurrent detector. Therefore, when a small-capacity power supply is used, the efficiency of a power semiconductor element, a choke coil, and transformer directly related to power conversion must be improved, and the losses of the peripheral circuits must be reduced.

Of these peripheral circuits, overcurrent detecting means are shown in FIGS. 3 and 4. The overcurrent detecting means shown in FIG. 3 is obtained by inserting a current detection resistor (R) in series with a load. This means advantageously has a simple structure. However, since the means detects a voltage drop which is in proportion to the resistance, the loss of the means increases in proportion to its square of output current. The overcurrent detector shown in FIG. 4 uses a current transformer and FETs. In this structure, an impedance inserted in the circuit can be advantageously decreased. However, in this circuit, a power loss is generated during a steady state operation of a power supply, and the efficiency of the power supply may be decreased. In addition, the current transformer, the FETs, and the like must be added, thereby increasing the number of parts.

At present, the operation voltage of an LSI tends to decrease, a power supply having a low-voltage and large-current output is required. For this reason, the loss of an overcurrent detector tends to increase. In this manner, in a compact, low-profile power supply, an overcurrent detecting means having a small loss is required. However, an effective means for solving the above problem has not yet been known.

SUMMARY OF THE INVENTION

It is an object of the present invention to provide a compact and low-profile magnetic element for a power supply capable of detecting an overcurrent with a low loss.

It is an object of the present invention to provide a dc-to-dc converter in that a loss due to the overcurrent detecting means is very low.

According to one aspect of the present invention, there is provided a magnetic element for use in a power supply comprising: a planar inductor comprising a planar coil, insulating layers disposed on the both surfaces of the planar coil and soft magnetic layers disposed on the outer surfaces of the insulating layers; and a search coil for detecting an overcurrent flowing the planar coil, disposed on at least one of the outer surfaces of the soft magnetic layers.

According to another aspect of the present invention, there is provided a magnetic element for use in a power supply comprising: a planar transformer comprising a planar primary coil and a planar secondary coil disposed through an insulating layer, insulating layers disposed on the surfaces of the primary and secondary coils and soft magnetic layers disposed on the outer surfaces of the insulating layers; and a search coil for detecting an overcurrent flowing the planar coil, disposed on at least one of the outer surfaces of the soft magnetic layers.

According to further aspect of the present invention, there is provided a dc-to-dc converter comprising: a switching means for generating a rectangular wave from an input voltage source; a means for modulating a pulse width of the rectangular wave generated by the switching means; a planar inductor comprising a planar coil, insulating layers disposed on the both surfaces of the planar coil and soft magnetic layers disposed on the outer surfaces of the insulating layers, which accumulates an electromagnetic energy at ON state and releases the accumulated electromagnetic energy at OFF state of the switching means; a capacitor for smoothing the wave generated by the switching means; a rectifying element; and a search coil for detecting an overcurrent flowing the planar coil, disposed on at least one of the outer surfaces of the soft magnetic layers constituting the planar inductor.

According to still another aspect of the present invention, there is provided a dc-to-dc converter comprising: a switching means for generating a rectangular wave from an input voltage source; a means for modulating a pulse width of the rectangular wave generated by the switching means; a planar transformer comprising a planar primary coil and a planar secondary coil disposed through an insulating layer, insulating layers disposed on the surfaces of the primary and secondary coils and soft magnetic layers disposed on the outer surfaces of the insulating layers, which accumulates an electromagnetic energy in the planar primary coil at ON state and releases the accumulated electromagnetic energy via the planar secondary coil at OFF state of the switching means; a capacitor for smoothing the wave generated by the switching means; a rectifying element; and a search coil for detecting an overcurrent flowing the planar coil, disposed on at least one of the outer surfaces of the soft magnetic layers constituting the planar transformer.

The dc-to-dc converter of the present invention may be a resonant converter in that a resonant circuit is incorporated in the switching means.

BRIEF DESCRIPTION OF THE DRAWINGS

FIG. 4 is a circuit diagram showing an over-current detecting means using a current transformer and FETs;

FIG. 5A is a sectional view showing a planar inductor having a search coil as an over-current detecting means in Example 1 of the present invention, and FIG. 5B is an equivalent circuit diagram showing the planar inductor in FIG. 5A;

FIG. 6A is a sectional view showing a planar transformer having a search coil as an over-current detecting means in Example 1 of the present invention, and FIG. 6B is an equivalent circuit diagram showing the planar transformer in FIG. 6B;

FIG. 7A is a view for explaining a magnetic flux distribution obtained when a load current is small, and FIG. 7B is a view for explaining a magnetic flux distribution obtained when a load current is large;

FIG. 9D is a circuit diagram showing a flyback type dc-to-dc converter having a planar transformer with a search coil, FIG. 9E is a diagram showing an over-current detecting circuit;

FIG. 12 is a perspective view showing a planar inductor having a Hall element as an over-current detecting means in Example 2 of the present invention;

FIG. 13 is a sectional view showing the planar inductor in FIG. 12;

FIG. 14 is an equivalent circuit diagram showing the planar inductor in FIG. 12;

FIG. 15 is a view for explaining the relationship between an external magnetic field B, a current I, and a Hall electromotive force Vh in the Hall element;

FIG. 18 is a graph showing a magnetization curve indicating the operating point of a soft magnetic layer constituting a planar inductor;

FIG. 35 is a circuit diagram showing the hybrid IC type dc-to-dc converter in FIG. 28;

FIG. 41 is a sectional view showing a general MOSFET diode;

FIG. 42A is a plan view showing an MOSFET diode in Example 6 of the present invention, and FIG. 42B is a sectional view showing the MOSFET diode along a line B–B' in FIG. 42A;

FIG. 56 is a circuit diagram showing a power supply of a CCD image pickup element.

DETAILED DESCRIPTION OF THE PREFERRED EMBODIMENTS

Figure 1:
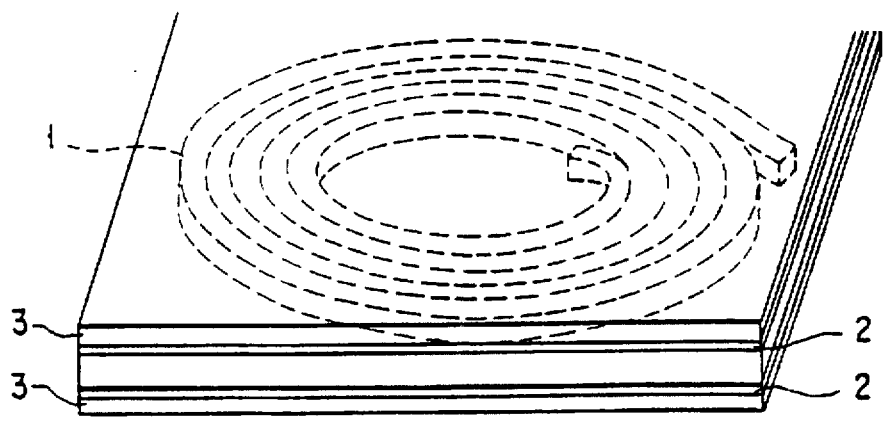
FIG. 1 is a perspective view showing a conventional planar inductor.
Figure 2:
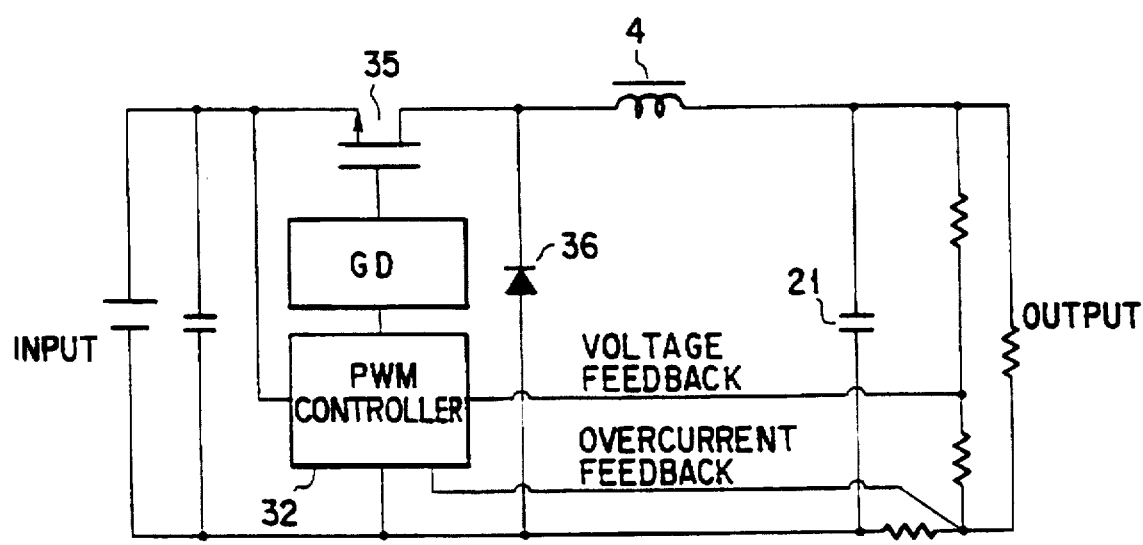
FIG. 2 is a circuit diagram showing a general buck chopper type dc-to-dc converter.
Figure 3:
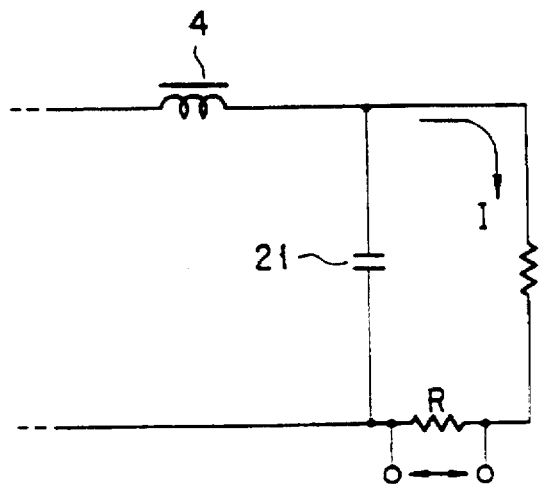
FIG. 3 is a circuit diagram showing an over-current detecting means using a current detection resistor.

The present invention will be described below in more detail.

In the magnetic element of the present invention, a planar inductor having a structure in that both the surfaces of a planar coil are sandwiched by insulating layers, and the resultant structure is sandwiched by magnetic layers. As the planar coil, coils such as a spiral coil, a meander coil, and a composite coil thereof having various shapes are used. Although the shape of the coil is not limited to a specific one, a spiral coil is preferably used. A method of manufacturing a spiral coil is not limited to a specific one. For example, after a conductive film is formed on a proper insulating surface, a spiral coil may be formed by a photoetching technique. The spiral coil may be formed by the following method. That is, a structure obtained by winding a conductive foil and an insulating sheet formed thereon is molded by a resin, and the resultant structure is sliced to have a proper thickness. In addition, various other methods can be used. Although a magnetic layer having a high saturation magnetic flux density, a small magnetostriction, and a small high-frequency core loss is preferably used as a soft magnetic layer, the soft magnetic layer is not limited to a specific one. As the soft magnetic layer, an amorphous or crystalline soft magnetic alloy containing at least one element of Fe, Co, and Ni, or a soft ferrite (Mn—Ze—ferrite or Ni—Zn—ferrite) is practically used. In addition, a multilayer obtained by stacking a soft magnetic foil and an insulating sheet may be used as the magnetic layer. A bare chip type planar inductor manufactured by a thin film process may be used.

In the magnetic element of the present invention, a search coil, preferably a planar search coil is disposed on at least one of the outer surfaces of said soft magnetic layers. The search coil serves as a detecting means for an over-current flowing the planar coil. That is, when the planar inductor is used as a choke coil, a dc current in proportion to a load current which is superimposed on an ac current flows in the planar coil. In this case, if an over-current flows in the planar coil, magnetic saturation occurs in the soft magnetic layers disposed on the upper and lower sides of the planar inductor, and consequently, a dc and an ac magnetic flux leak to the outside of the soft magnetic layers. Therefore, an electromotive force dependent on the over-current is induced by the search coil disposed near the soft magnetic layer. In addition, since the search coil is not directly inserted in the main circuit, the search coil is free from any loss in a rated operation.

According to another magnetic element of the present invention, a planar transformer that comprises a planar primary coil and a planar secondary coil disposed through an insulating layer, insulating layers disposed on the surfaces of the primary and secondary coils and soft magnetic layers disposed on the outer surfaces of the insulating layers. Such a planar transformer can be manufactured by the similar methods as those used to manufacture the planar inductor above described. A search coil, preferably a planar search coil, is disposed on at least one of the outer surfaces of the soft magnetic layers also in the planar transformer. An overcurrent can be detected by the search coil based on the same principle as described above.

A circuit arrangement of the dc-to-dc converter according to the present invention is not limited to specific one. For example, a non-isolated chopper type dc-to-dc converter utilizing a planar inductor, or an isolated flyback type or forward type dc-to-dc converter utilizing a planar transformer may be used. In addition, when the dc-to-dc converter is switched at a higher frequency than 1 MHz, a resonance type circuit arrangement or a partial resonance type circuit arrangement may be used.

More specifically, a dc-to-dc converter comprises a switching means for generating a rectangular wave from an input voltage source, a means for modulating a pulse width of the rectangular wave generated by the switching means, an inductor that accumulates an electromagnetic energy at ON state and releases the accumulated electromagnetic energy at OFF state of the switching means, a capacitor for smoothing the wave generated by the switching means, and a rectifying element. The isolated dc-to-dc converter comprises a transformer, instead of the inductor in the non-isolated one, that accumulates an electromagnetic energy due to the current flowing the primary coil at ON state and releases the accumulated electromagnetic energy via the secondary coil at OFF state of the switching means.

In the non-isolated dc-to-dc converter according to the present invention, a planar inductor is used as the inductor that comprises a planar coil, insulating layers disposed on the both surfaces of the planar coil and soft magnetic layers disposed on the outer surfaces of the insulating layers, and a search coil for detecting an overcurrent flowing the planar coil is disposed on at least one of the outer surfaces of the soft magnetic layers.

In the isolated dc-to-dc converter according to the present invention, a planar transformer is used as the transformer that comprises a planar primary coil and a planar secondary coil disposed through an insulating layer, insulating layers disposed on the surfaces of the primary and secondary coils and soft magnetic layers disposed on the outer surfaces of the insulating layers, and a search coil for detecting an overcurrent flowing the planar coil is disposed on at least one of the outer surfaces of the soft magnetic layers.

The dc-to-dc converter of the present invention can effectively detect overcurrent on the basis of the principle above mentioned. In this case, the switching means will be effectively controlled by feedback of the detected signal to a control circuit of the switching means. In addition, since the search coil is not directly inserted in the main circuit, a loss in a rated operation can be neglected.

In the present invention, the dc-to-dc converter can be made more compact when the semiconductor switching element is fabricated on a semiconductor substrate, and the search coil and planar inductor or planar transformer are formed on the semiconductor substrate with being insulated.

The dc-to-dc converter of the present invention may be more compact when a highly heat-conductive insulating substrate having a recessed portion is used and circuit parts are mounted on this substrate with at lease the planar magnetic element being buried in the recessed portion.

In this case, as the material of a highly heat-conductive substrate, AlN, $Al_2O_3$, SiC, or FR-4 or a metal substrate having an insulated surface is used. When a substrate material which requires a sintering process is used, green sheets may be formed using a die such that a plurality of recessed portions respectively corresponding to circuits are periodically formed, and the green sheets may be sintered at one time. A pattern for the recessed portions is not limited to a specific one. The planar magnetic element is buried in a recessed portion of a highly heat-conductive insulating substrate so as to be in direct contact with a substrate. Therefore, heat generated by the planar magnetic element can be preferably dissipated through the substrate.

According to the present invention, a multilayered ceramic capacitor is preferably used as a capacitor. The multilayered ceramic capacitor is not limited to a specific one. An E-type multilayered ceramic capacitor having poor temperature characteristics may be satisfactorily used because heat dissipation is preferably performed by the highly heat-conductive insulating substrate. However, since the adhering process for layers is used during the manufacture of the planar magnetic element, a ceramic capacitor whose characteristics are rarely degraded by a curing process is preferably used. Although the capacitance of the capacitor is dependent on a frequency to be used, the capacitance is several 10 µF in a several 100 kHz band, and several µF in a several MHz band. This capacitor is preferably formed in a recessed portion of the highly heat-conductive insulating substrate.

In the present invention, a multilayered wiring substrate, for example, consisting of polyimide and copper used in a multi-chip module is used to be laminated on the recessed portion. In this case, the thermal expansion coefficient of the multilayered wiring material and the thermal expansion coefficient of the highly heat-conductive substrate are preferably set as close as possible in consideration of an increase in temperature of a dc-to-dc converter. When both the thermal expansion coefficients are largely different from each other, a stress relaxing layer is preferably formed. Note that a magnetic shield layer may be formed between the planar magnetic element and the wiring multilayer. As described above, the planar magnetic element, the multilayered ceramic capacitor, the wiring multilayer, and the like are buried in a recessed portion of the highly heat-conductive insulating substrate, and the upper surface of the buried portion is set at the same level as that of a projecting portion of the highly heat-conductive substrate.

Further, a switching element power MOSFET), a diode, a control IC, and external parts (a gate driver, a capacitor, an external resistor, and the like) are formed on the upper surface of the highly heat-conductive insulating substrate. Of these parts, the power MOSFET and diode which generate high-temperature heat are preferably formed on the projecting portion of the highly heat-conductive substrate to conduct the heat. Other low-power parts which generate heat at relatively low temperatures are formed on the wiring multilayer. When bare chips for the parts are mounted on the upper surfaces of the projecting portion and the wiring multilayer, and wire bonding is to be performed by a bending wire machine using an ultrasonic wave, bonding properties are considerably degraded due to the presence of a cavity in the above structure. Therefore, when the layers are formed, or the stacked layers adhere to each other, a void or cavity is prevented from being formed between these layers. An external electrode is arranged on a side surface of the highly heat-conductive substrate, and a ground electrode is formed on the surface except for the surface on which the external electrode is formed.

In such a hybrid IC type dc-to-dc converter, a planar magnetic element having a large area is buried in a recessed portion of a highly heat-conductive substrate, other low-power parts are mounted by a wiring multilayer. For this reason, the parts can be mounted at a high density. In addition, a part such as a planar magnetic power element is mounted in direct contact with the highly heat-conductive substrate, thereby preferably performing heat conduction. Therefore, a dc-to-dc converter which has a small size and can output a high power can be provided.

EXAMPLES

Examples of the present invention will be described below with reference to the accompanying drawings.

Example 1

A means for detecting an overcurrent according to the present invention will be described. FIG. 5A is a sectional view showing an overcurrent detecting means in this Example, and FIG. 5B is an equivalent circuit of the overcurrent detecting means in FIG. 5A. Referring to FIG. 5A, an insulating layer 2 and a soft magnetic layer 3 are formed on each of both surfaces of a planar coil 1 having a spiral shape, thereby constituting a sandwich type planar inductor 4. A search coil 52 is arranged, being insulated with an insulating layer 2, near one of the upper and lower soft magnetic layers 3 constituting the planar inductor 4. Note that the search coil 52 is connected to a detector circuit described below.

The means for detecting an overcurrent according to the present invention may be applied to a transformer. FIG. 6A is a sectional view showing a planar transformer having a search coil as an overcurrent detecting means, and FIG. 6B is an equivalent circuit diagram showing the planar transformer in FIG. 6B.

A dc current in proportion to a load current which is superposed on an ac current flows in the planar coil 1 constituting the planar inductor 4 in FIG. 5. FIG. 7A shows a magnetic flux distribution obtained when a load current is small, and FIG. 7B shows a magnetic flux distribution obtained when a load current is large. As shown in FIG. 7A, when the load current is small, a generated magnetic flux is shielded by the upper and lower soft magnetic layers 3 not to leak to the outside of the planar inductor 4. On the other hand, as shown in FIG. 7B, when the load current is large, a dc magnetic flux and an ac magnetic flux leak to the outside of the planar inductor 4 because magnetic saturation occurs in the upper and lower soft magnetic layers 3.

Figure 8:
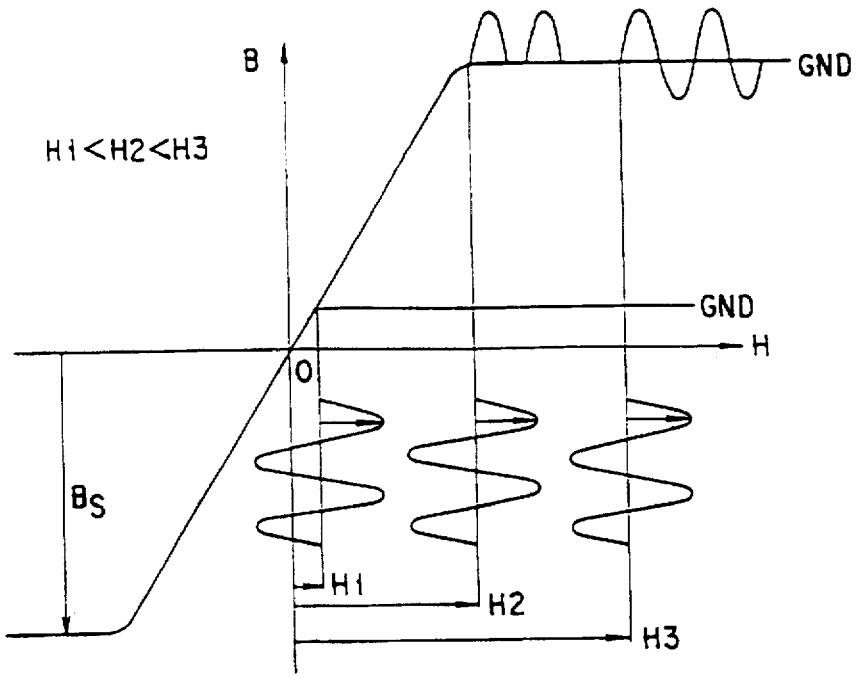
FIG. 8 is a graph showing a magnetization curve indicating the relationship between the operating point of a soft magnetic layer and the electromotive force of the search coil in the planar inductor in FIG. 5.

FIG. 8 shows operations of the soft magnetic layer in these states and the electromotive force of the search coil 52 arranged near the soft magnetic layer. That is, when each of the soft magnetic layers 3 is operated near the saturation point of a magnetization curve, an ac magnetic flux exceeding the magnetic saturation point leaks to the outside of the soft magnetic layer 3. For this reason, an electromotive force is induced by the search coil 52. The magnitude of the induced electromotive force is dependent on a degree of saturation of the soft magnetic layer 3, i.e., a dc magnetic field (e.g., $H_2$ or $H_3$), and hence the magnitude of a dc current flowing in the planar coil 1. Therefore, an overcurrent can be detected on the basis of the induced electromotive force. On the other hand, when the dc current flowing in the planar coil 1 is small, any magnetic flux does not leak to the outside of the soft magnetic layers 3, and an electromotive force induced by the search coil 52 is very small. In this case, since the search coil 52 is not directly inserted in the main circuit, the search coil 52 is advantageously free from any loss. In addition, since the search coil and a detector circuit need only be added to the circuit, a simple circuit arrangement can be obtained.

Figure 9A:
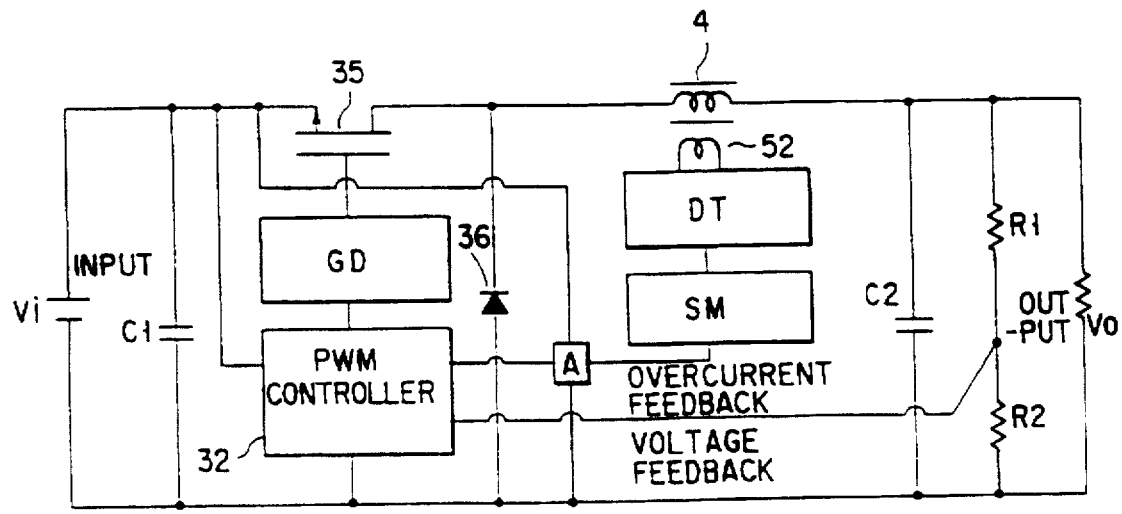
FIG. 9A is a circuit diagram showing a buck chopper type dc-to-dc converter having the planar inductor in FIG. 5.
Figure 9B:
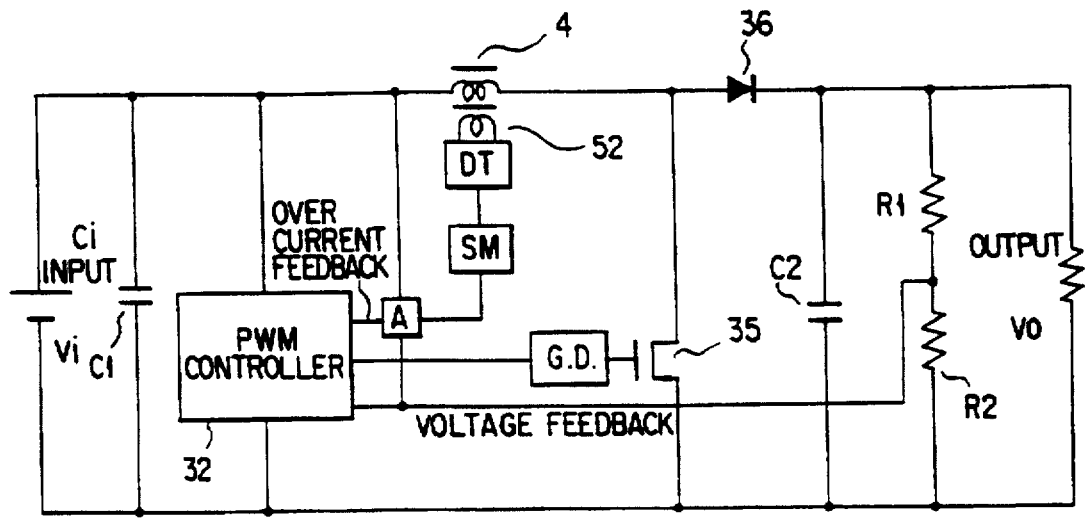
FIG. 9B is a circuit diagram showing a boost chopper type dc-to-dc converter having a planar inductor.
Figure 9C:
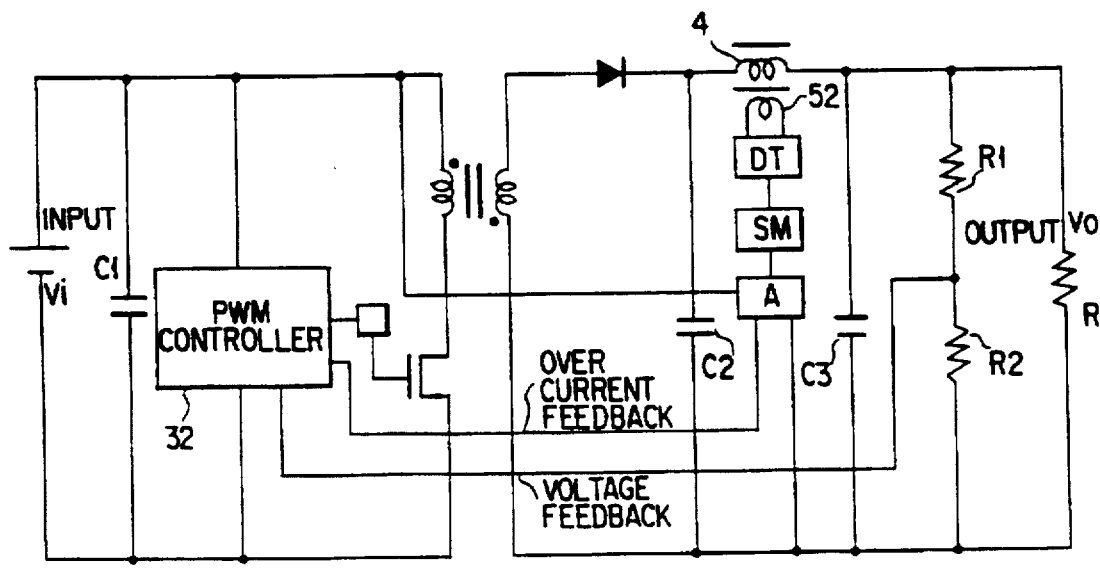
FIG. 9C is a circuit diagram showing a flyback type dc-to-dc converter having a planar inductor with a search coil.

FIG. 9A shows a buck (step-down) chopper type dc-to-dc converter in which planer inductor having the overcurrent detecting means shown in FIG. 5 is used as a choke coil. The operation the dc-to-dc converter shown in FIG. 9A will be described. The ON/OFF operation of switching transistor 35 is controlled by PWM controller 32 and gate driver (GD). When the switching transistor turns ON, input current flows the load, and an electromagnetic energy is accumulated in the inductor 4 and capacitor (C2) is also charged. When the switching transistor turns OFF, the electromagnetic energy in the inductor 4 and the charge in capacitor (C2) is released to the load. By controlling the ratio between ON time and OFF time of the switching transistor 4 with PWM controller 32, the voltage applied to the load is regulated constantly. In this operation, if an overcurrent flows in planar inductor 4 described as above, an induced electromotive force generates in the search coil 52. A detector (DT) and a smoothing circuit (SM), and optionally a dc voltage amplifier if desired, are connected to the search coil 52, and the output terminal of the smoothing circuit is connected to the overcurrent detection terminal of the PWM controller 32. If an appropriate voltage divider is arranged at the overcurrent detection terminal of the PWM controller 32, the level of the overcurrent to be detected can be readily adjusted. The planar inductor having the search coil shown in FIG. 5 or the planar transformer having the search coil shown in FIG. 6 may be applied to various power supply circuits as described below. FIG. 9B is a circuit diagram showing a boost chopper type dc-to-dc converter having a planar inductor. FIG. 9C is a circuit diagram showing a flyback type dc-to-dc converter having a planar inductor with a search coil. FIG. 9D is a circuit diagram showing a flyback type dc-to-dc converter having a planar transformer with a search coil. FIG. 9E is a diagram showing an another overcurrent detecting circuit.

Figure 10:
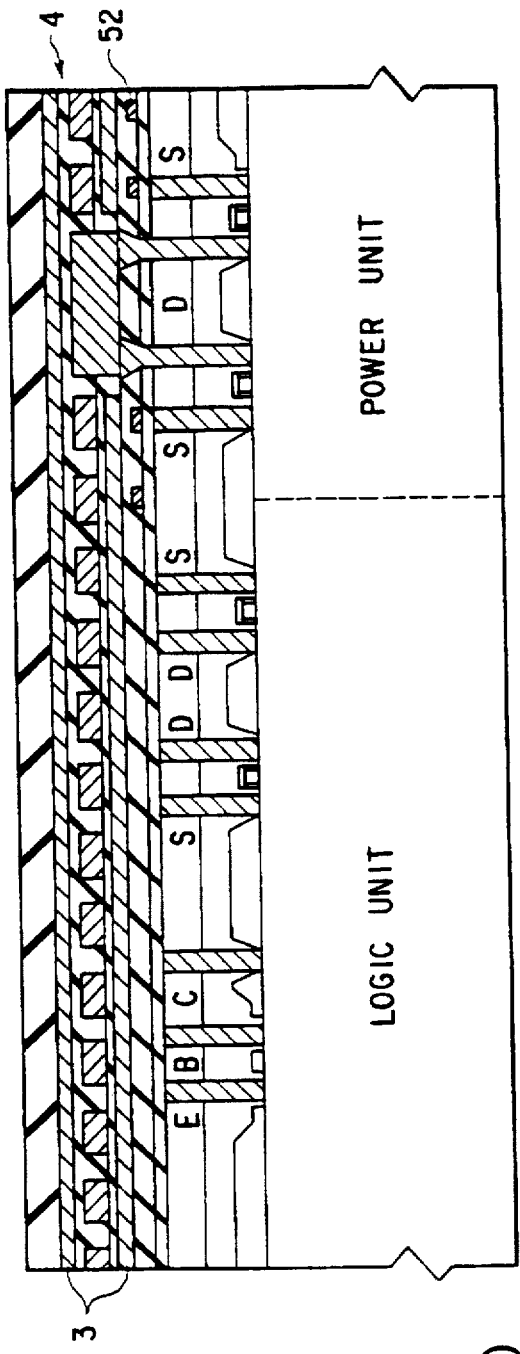
FIG. 10 is a sectional view showing a monolithic micro power supply having a planar inductor and a search coil.
Figure 11:
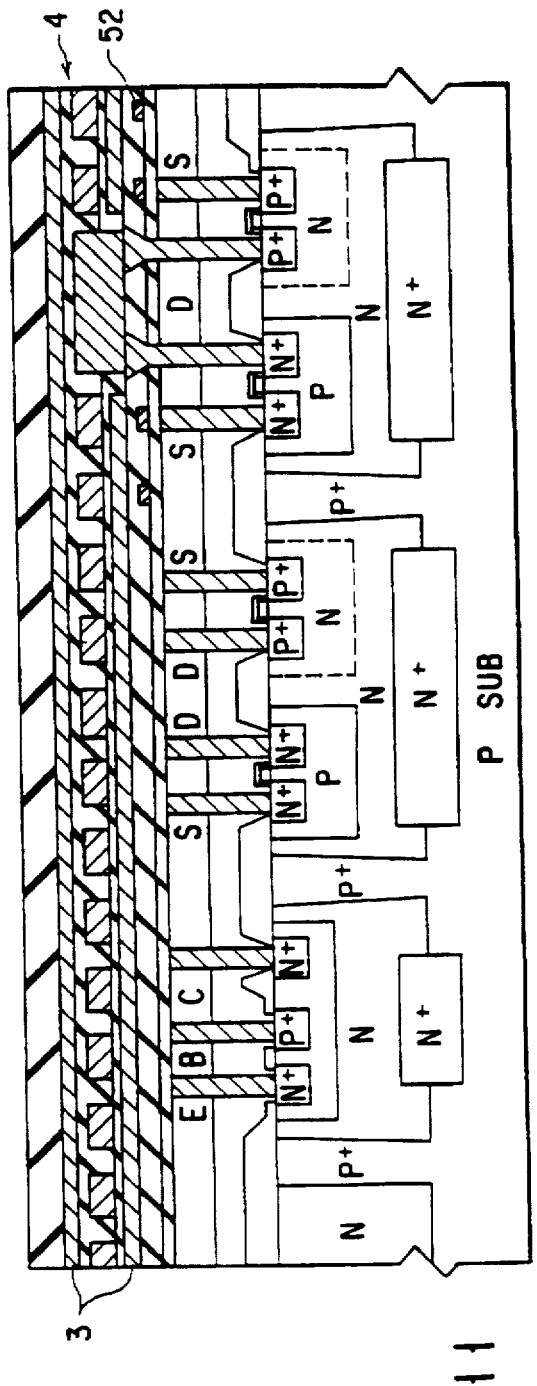
FIG. 11 is a sectional view showing a monolithic micro power supply having a planar inductor and a search coil.

FIGS. 10 and 11 are a sectional view showing a one-chip micro power supply obtained by monolithically stacking a semiconductor IC and a sandwich type planar magnetic element by a thin-film process. In this power supply, the search coil 52 is formed under the planar inductor.

Note that the overcurrent detecting means in this Example may be applied to various power conversion circuit such as invertors in that the planar magnetic element is utilized.

Example 2

In this Example, there are provided a planar inductor obtained by arranging an overcurrent detecting means comprising a Hall element.

FIG. 12 is a perspective view showing an overcurrent detecting means in this Example, FIG. 13 is a sectional view showing the overcurrent detecting means in FIG. 12, and FIG. 14 is an equivalent circuit of the overcurrent detecting means in FIG. 12. Referring to FIGS. 12 and 13, an insulating layer 2 and a soft magnetic layer 3 are formed on each of the surfaces of a planar coil having a spiral shape, thereby constituting a sandwich type planar inductor 4. A semiconductor Hall element 51 is arranged in a space at the central portion of the planar coil 1. One terminal of the Hall element 51 is connected to the electrode of the planar coil 1, and the other terminal serves as an external electrode. Note that the Hall element 51 is connected to a detector circuit.

Figure 16:
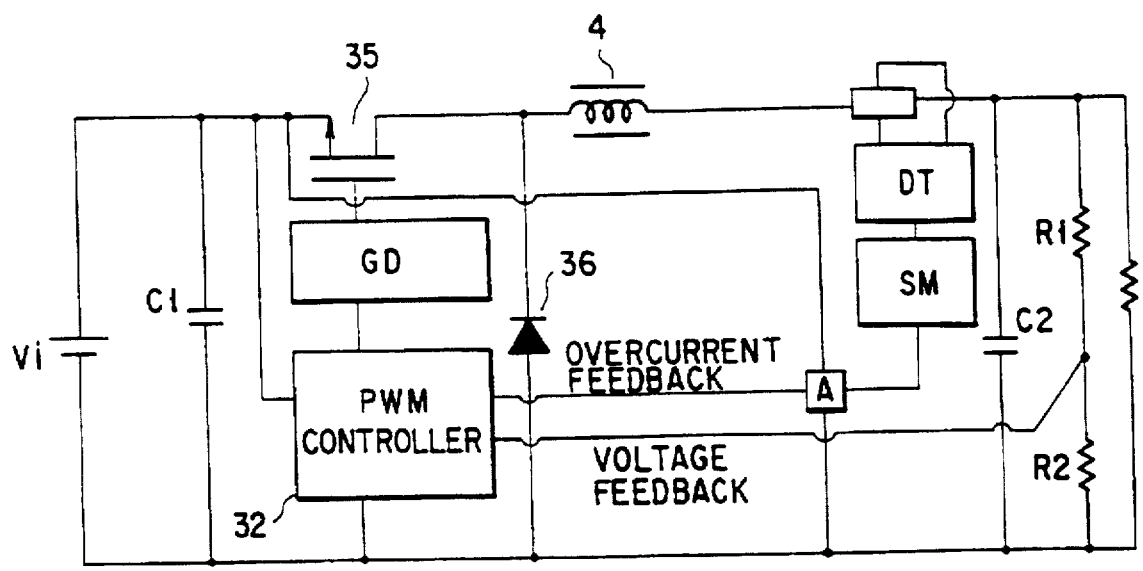
FIG. 16 is a circuit diagram showing a buck chopper type dc-to-dc converter having the planar inductor in FIG. 12.

Provided that the planar inductor 4 in which the Hall element 51 is arranged is used as a choke coil of a buck chopper type dc-to-dc converter as shown in FIG. 16. A dc current I proportional to a load current flowing in the planar coil 1 flows in the Hall element 51, and a dc magnetic field B is applied in the direction perpendicular to the film surface of the Hall element 51 as shown in FIG. 13. In this case, as shown in FIG. 15, a Hall electromotive force Vh is generated across the Hall element 51. The value of the Hall electromotive force Vh is expressed by the following equation:

$$Vh = iBl/ne \ [v] \tag{1}$$

where i is a current density. The current density i is expressed by the following equation:

$$i = I/ta \tag{2}$$

where n is a carrier concentration; e, a carrier charge; t, the thickness of the Hall element; a is the width of the Hall element; and 1 is the length of the Hall element. The magnetic field B in equation (1) is a function of I because B is generated by a current flowing in the planar coil. Therefore, if a proportional constant is represented by k, the following relationship is given:

$$Vh = kI^2 \tag{3}$$

In order to detect an overcurrent, it suffices to detect the dc component of the Hall electromotive force Vh with the detector circuit.

As indicated by equation (3), the Hall electromotive force is in proportion to the square of a current I flowing in the planar coil. Therefore, the overcurrent detecting means has a high current detection sensitivity, and effectively detects a current when an overcurrent flows.

On the other hand, the power loss of the Hall element 51 is the sum of a Joule loss caused by a current flowing in the Hall element 51 and an eddy-current loss caused by an ac magnetic field. Even when the carrier concentration of the Hall element is increased, since the resistivity of the Hall element is higher than that of a metal material, the eddy-current loss caused by the ac magnetic field can be almost neglected. In addition, the Joule loss is in proportion to the resistance of the Hall element, and is essentially dependent on the size of the element. That is, when the thickness t and the width a are increased, and the length 1 is decreased, the Joule loss can be decreased. Therefore, the power loss of the Hall element 51 is very small.

Since the planar inductor and the Hall element are integrated with each other, a simple circuit arrangement can be obtained. When a planar magnetic element is formed by a thin-film process, the planar magnetic element can be more easily integrated with the Hall element. Note that, even when a magnetoresistance effect element (MR element) is used in place of the Hall element, an overcurrent can be detected.

Example 3

A means for improving superimposed dc current characteristics of a planar magnetic element will be described in this Example.

Figure 17:
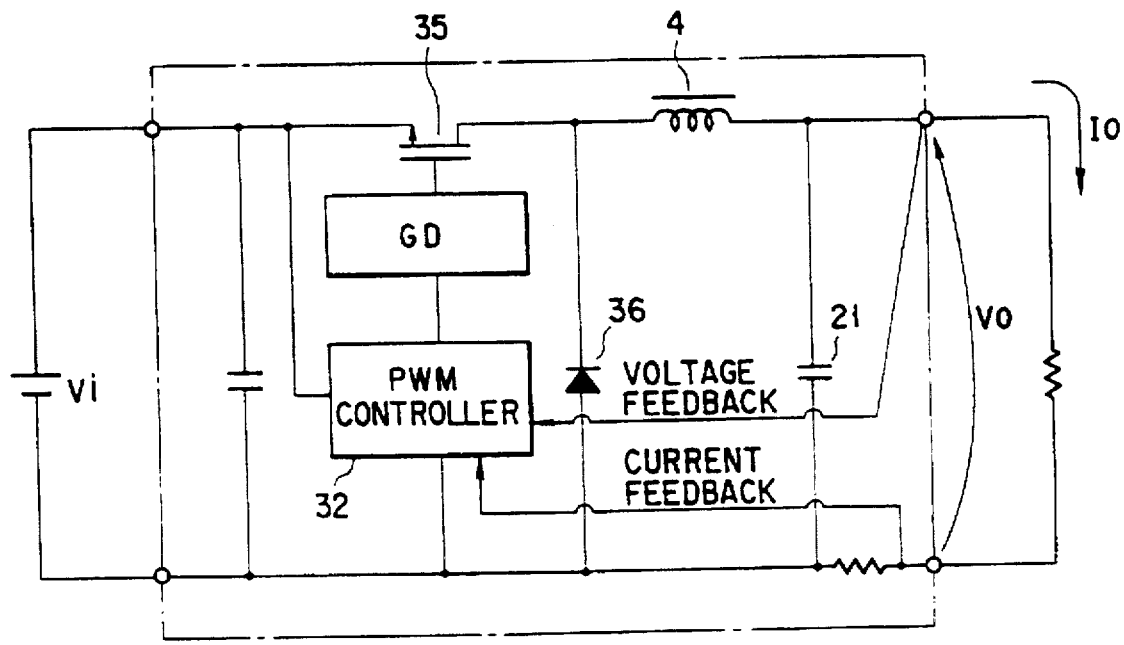
FIG. 17 is a circuit diagram showing a general buck chopper type dc-to-dc converter.

FIG. 17 shows a buck chopper type dc-to-dc converter. As a choke coil in FIG. 17, a planar inductor 4 sandwiched by soft magnetic layers is applied. A dc current corresponding to a load current and an ac current generated by switching flow in the planar inductor 4. As shown in FIG. 18; the magnetization curve of the soft magnetic layer of the planar inductor traces a minor loop on the basis of the dc bias magnetic field. An operating point obtained at this time is indicated by a. In this case, when a load current increases, a dc magnetic field increases, and the operating point of the soft magnetic layer comes close to a magnetic saturation region indicated by b. For this reason, the permeability decreases, and the inductance abruptly decreases. As a result, since the peak value of the ac current greatly increases, a semiconductor switch may be broken down.

Figure 19:
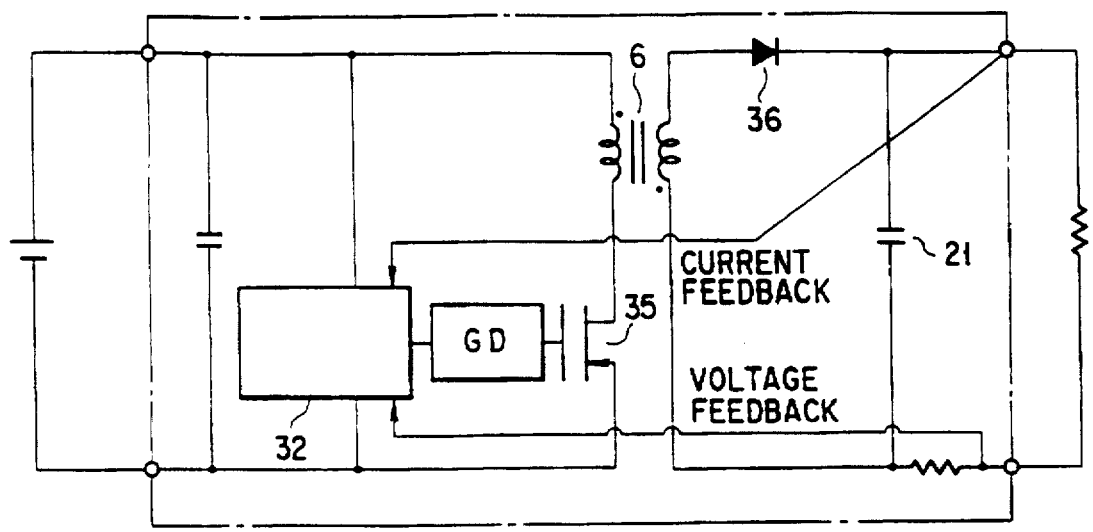
FIG. 19 is a circuit diagram showing a general flyback type dc-to-dc converter.

FIG. 19 shows a flyback type dc-to-dc converter. As a transformer in FIG. 19, a planar transformer 6 sandwiched by soft magnetic layers is applied. The primary current of the transformer 6 includes a dc component which is in proportion to a load current and an ac component generated by switching. In this case, when the load current increases, a soft magnetic material is saturated, and the same problem as in the choke coil in FIG. 17 is posed, and energy cannot be efficiently transmitted.

In the planar inductor 4 or the planar transformer 6, since a large magnetic field is generated per unit current, the magnetic saturation described above has a very large influence. Therefore, each of these planar magnetic elements should represent preferable superimposed dc current characteristics in which an inductance rarely changes even when a dc current increases.

In this Example, auxiliary planar coils each having the same shape as that of the planar coil are arranged on the upper and lower surfaces of the planar magnetic element having the structure in which the planar coil is sandwiched by the soft magnetic materials. A dc current is made flow in the auxiliary planar coils to cancel a dc magnetic field generated by the dc current flowing in the internal planar coils, thereby improving dc superimposed dc current characteristics.

Figure 20:
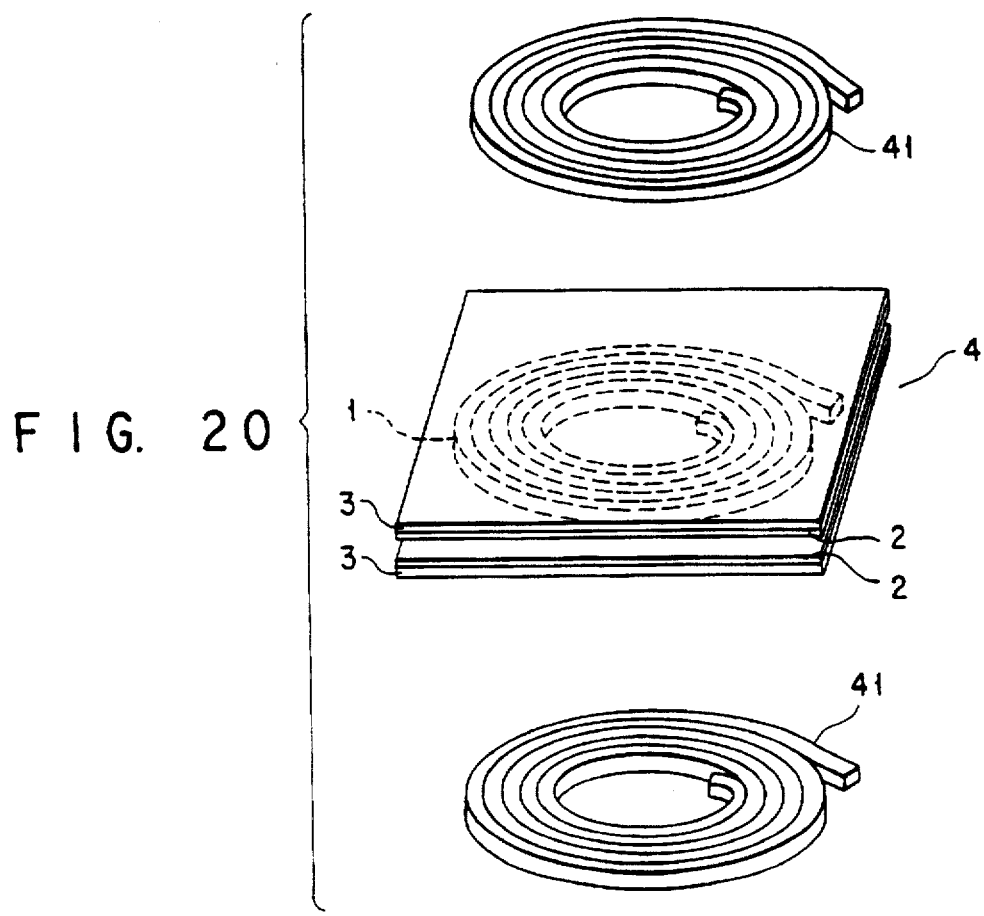
FIG. 20 is an exploded perspective view showing the planar inductor in Example 3 of the present invention.
Figure 21A:
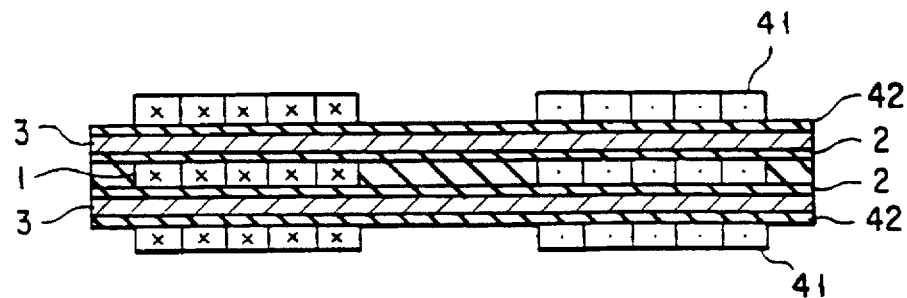
FIG. 21A is a sectional view showing the planar inductor in FIG. 20.
Figure 21B:
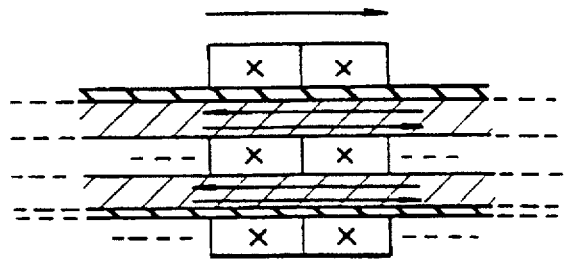
FIG. 21B is a view for explaining dc magnetic fields generated by a planar coil and an auxiliary planar coil constituting the planar inductor in FIG. 20.

FIG. 20 is an exploded perspective view showing a planar inductor according to this Example, FIG. 21A is a sectional view showing the planar inductor, and FIG. 21B is an enlarged view for explaining magnetic fields generated by the coils. As shown in FIG. 20, an insulating layer 2 and a soft magnetic layer 3 are formed on each of the upper and lower surfaces of a planar coil 1 to constitute the planar inductor 4. In addition, auxiliary coils 41 each having the same shape as that of the planar coil 1 are arranged on the upper and lower surface of the soft magnetic layers 3 through insulating layers 42.

As shown in FIGS. 21A and 21B, a dc current flows in the auxiliary coils 41 to generate dc magnetic fields, thereby canceling a dc magnetic field generated by the internal planar coil 1. In this manner, as indicated by c in FIG. 18, the soft magnetic layer can be operated near the origin of the magnetization curve, and a decrease in permeability can be compensated.

In this case, when the dc current flowing in the auxiliary coils 41 is increased in proportion to a load current flowing in the planar coil 1, a range in which the operating point of the soft magnetic layer is moved with the increase in load current can be narrowed. In addition, when the dc current is accurately adjusted, the operating point of the soft magnetic layer can be fixed near the origin, and the inductance of the planar inductor can be kept constant regardless of an increase in load current.

Figure 23A:
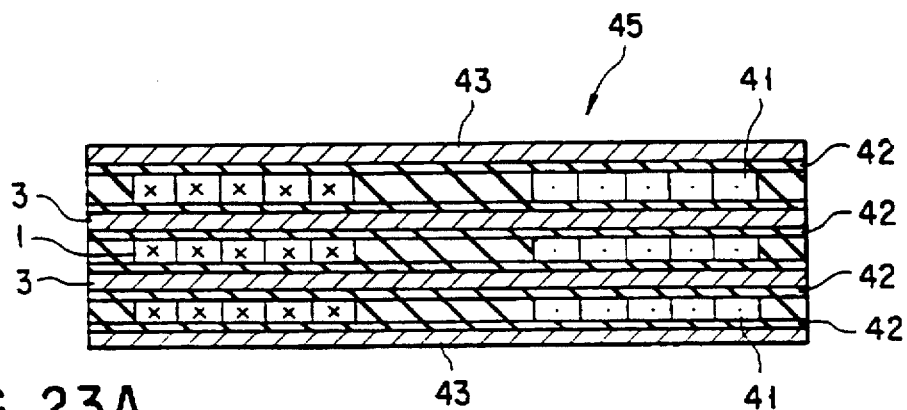
FIG. 23A is a sectional view showing the planar inductor in FIG. 22.
Figure 23B:
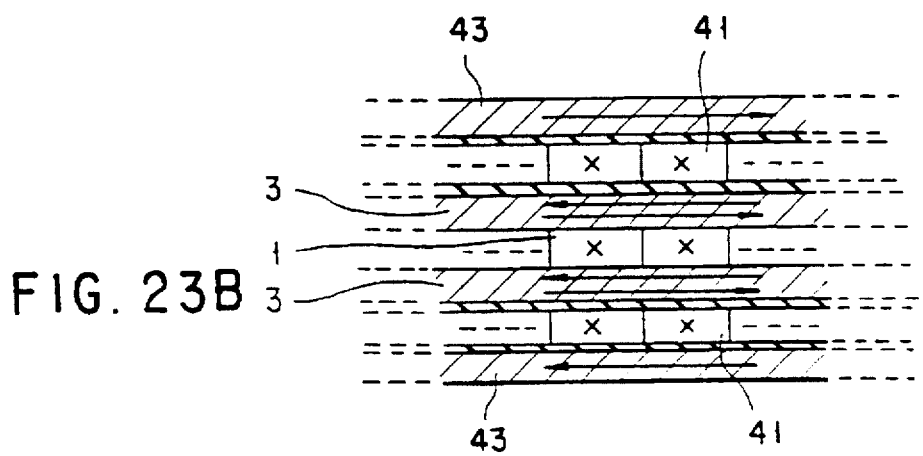
FIG. 23B is a view for explaining dc magnetic fields generated by a planar coil and an auxiliary planar coil constituting the planar inductor in FIG. 22.
Figure 22:
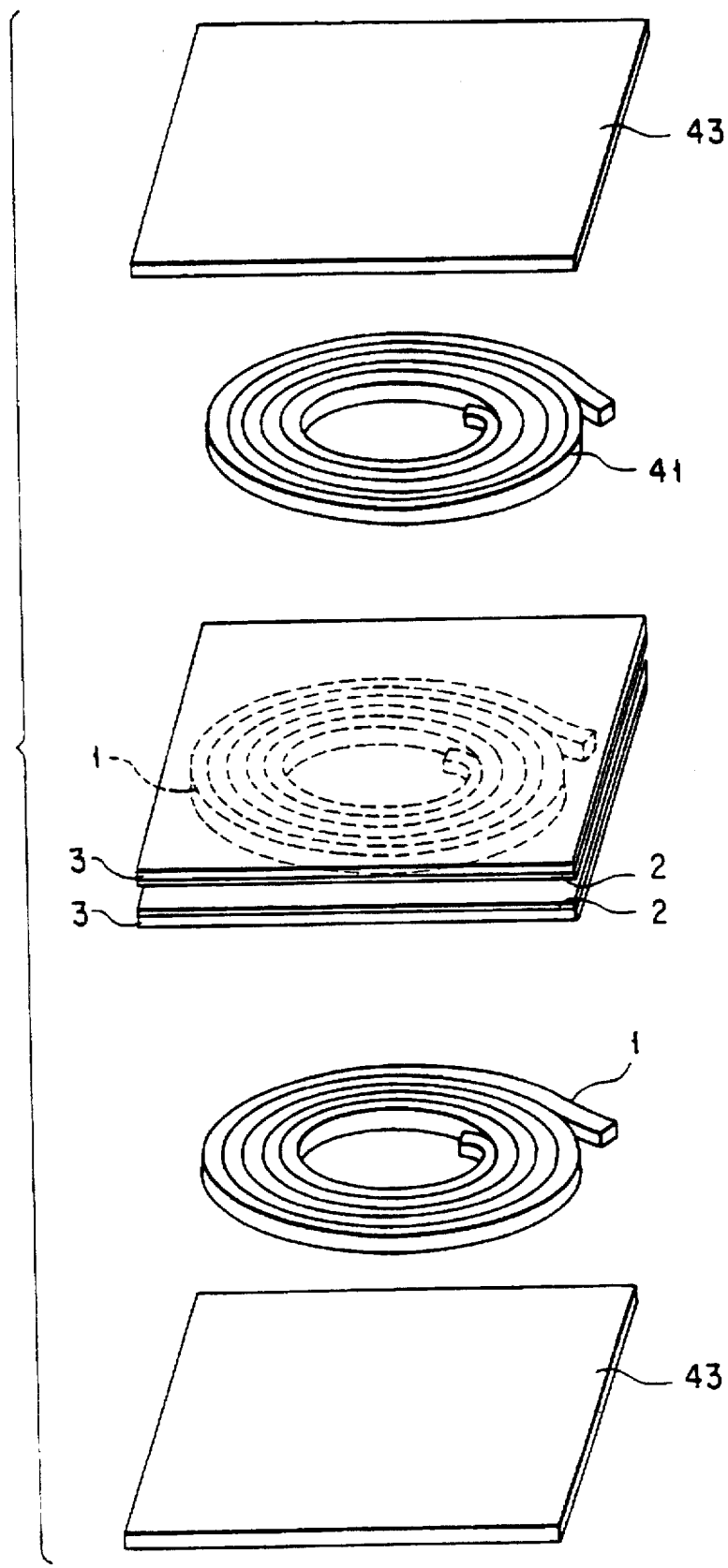
FIG. 22 is an exploded perspective view showing another planar inductor in Example 3 of the present invention.

FIGS. 22, 23A and 23B show a structure in which soft magnetic layers 43 are formed on the upper and lower surfaces of the auxiliary coils 41 in FIG. 20 through insulating layers 42. As shown in FIGS. 23A and 23B, in a planar inductor 45 having the above structure, the internal planar coil 1 and the auxiliary coils 41 can be arranged geometrically equivalent to each other. Therefore, the dc magnetic field generated by the load current flowing in the planar coil 1 can be almost completely canceled. In addition, the outermost soft magnetic layers 43 have an effect of preventing the dc magnetic field from leaking to the outside of the planar inductor. However, in many cases, leakage of a dc magnetic field rarely poses any problem.

Figure 24:
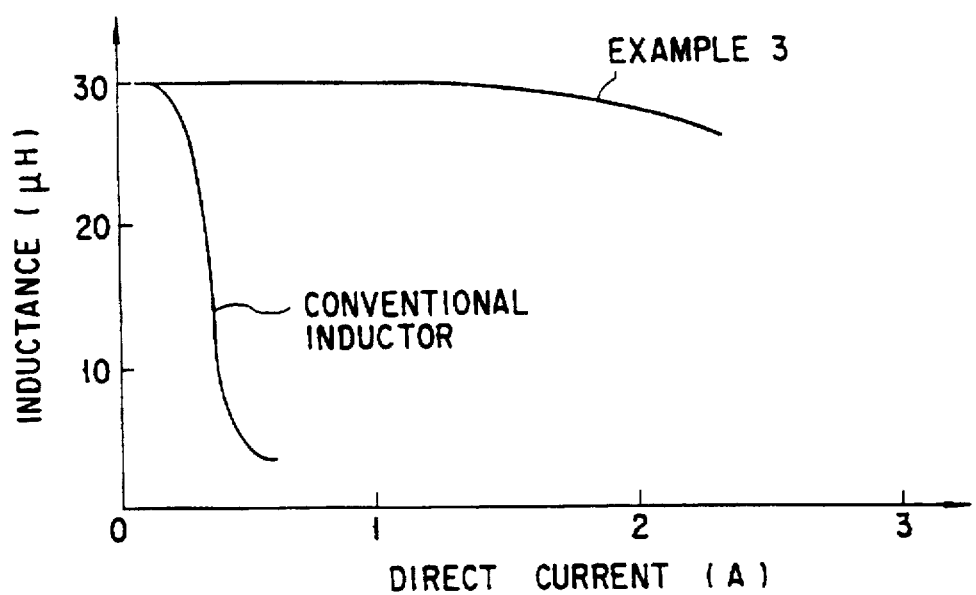
FIG. 24 is a graph showing the superimposed dc current characteristics of a conventional planar inductor and the planar inductor according to Example 3 of the present invention.

FIG. 24 shows the superimposed dc current characteristics of a conventional planar inductor and a planar inductor according to this Example. As is apparent from FIG. 24, in the planar inductor according to Example 3, an inductance rarely decreases even when a load dc current increases. Therefore, the superimposed dc current characteristics of the planar inductor according to Example 3 are greatly improved compared with those of the conventional planar inductor.

Figure 25:
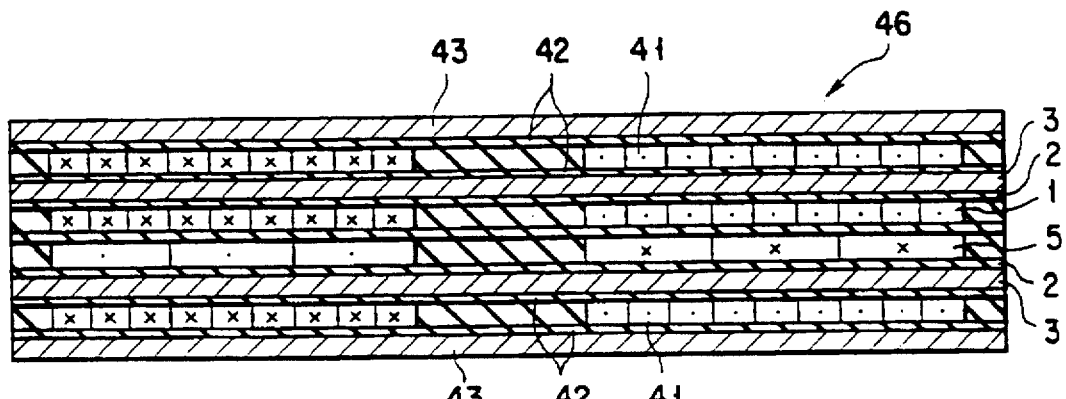
FIG. 25 is a sectional view showing a planar transformer in Example 3 of the present invention.

FIG. 25 shows a structure obtained by applying a means according to Example 3 to a planar transformer. A planar transformer 46 has the same arrangement as that of the planar inductor shown in FIG. 23 except that a planar coil 5 on the secondary side is formed, through the insulating layer 2, on the planar coil 1 on the primary side. In the planar transformer 46, although a dc current is superimposed on an ac current in the internal planar coil to generate a dc magnetic field, if a dc current flows in the auxiliary coils 41, the dc magnetic field generated by the internal planar coil can be canceled. Therefore, since the inner soft magnetic layers 3 traces a minor loop near the origin of the magnetization curve, a magnetic saturation phenomenon can be suppressed.

Figure 26:
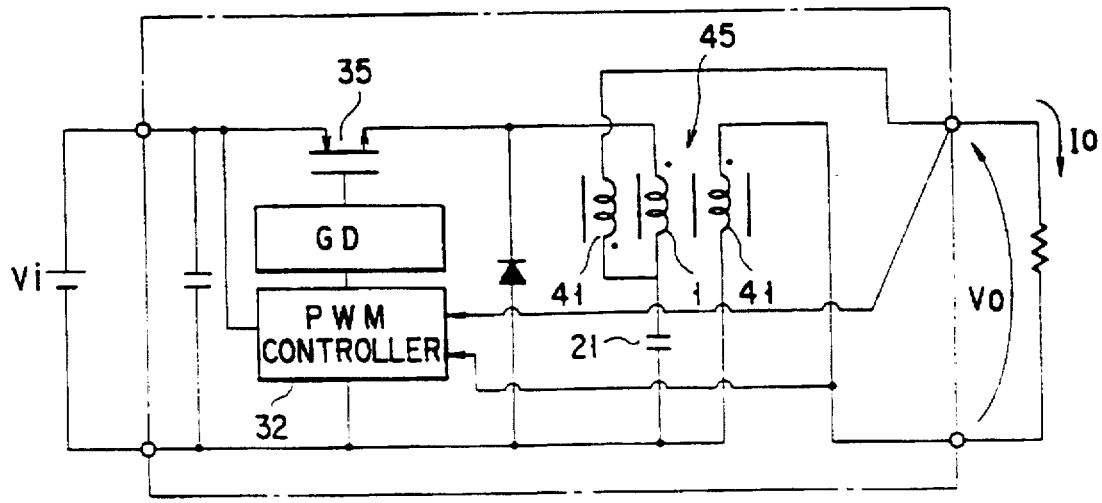
FIG. 26 is a circuit diagram showing a buck chopper type dc-to-dc converter to which the planar inductor according to Example 3 of the present invention is applied.

FIG. 26 is a circuit diagram showing a buck chopper type dc-to-dc converter using the planar inductor 45, shown in FIG. 23, as a choke coil. In this dc-to-dc converter, the auxiliary planar coils 41 are connected in series with a load. Therefore, equal load currents flow in the planar coil 1 and the auxiliary planar coils 41 in the planar inductor, and a decrease in inductance caused by an increase in load current can be suppressed. As a result, since an increase in ac peak current can be suppressed, an increase in output ripple noise can be suppressed. In this dc/dc converter, the dc current of each of the auxiliary coils 41 is used as a current detection resistor, and can be used to detect an overcurrent. For this reason, a current detection resistor is not required.

Figure 27:
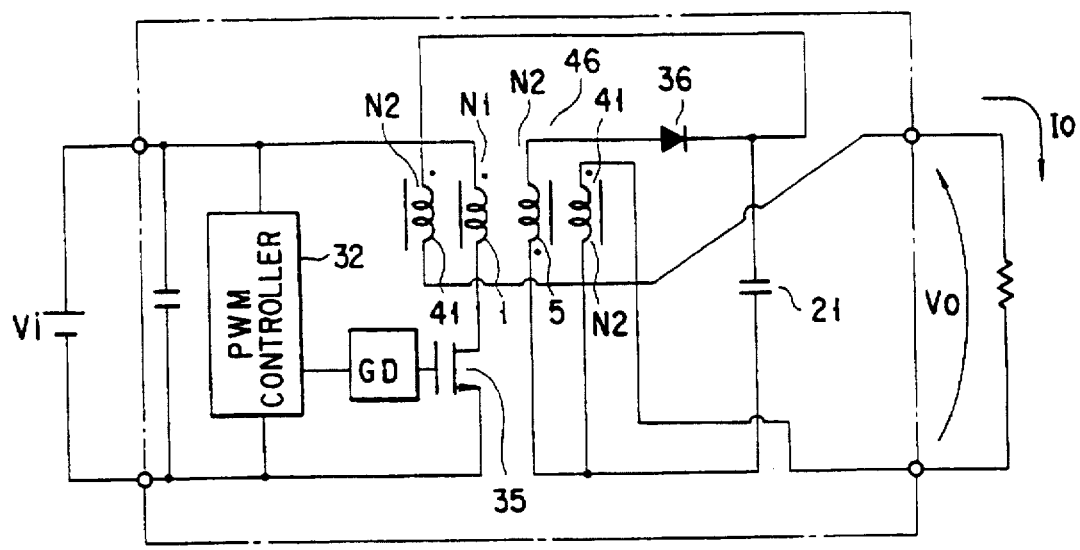
FIG. 27 is a circuit diagram showing a flyback type dc-to-dc converter to which the planar transformer according to Example 3 of the present invention is applied.

FIG. 27 is a circuit diagram showing a flyback type dc-to-dc converter to which the planar transformer 46, shown in FIG. 25, is applied. In this dc-to-dc converter, coils each having the same shape as that of the internal secondary planar coil 5 are used as the auxiliary planar coils 41, and the auxiliary planar coils 41 are connected in series with a load. With the above arrangement, a magnetic saturation phenomenon can be suppressed because a dc magnetic field generated in the internal soft magnetic layer can be canceled. Therefore, since this transformer is operated near the origin of the magnetization curve regardless of the magnitude of the load current, a stress acting on a semiconductor switch can be suppressed, and a decrease in energy transmission efficiency can be suppressed.

The means according to this Example 3 can be applied to not only the above dc-to-dc converters but also dc-to-dc converters using another scheme. In addition, if a dc current capable of canceling the dc magnetic field generated by the internal planar coil can be made flow in the auxiliary planar coils, a method of flowing the dc current in the auxiliary planar coils is not limited to the method described above.

Example 4

A planar magnetic element occupies an area larger than that of another part (semiconductor element, multilayered ceramic capacitor, or the like). Thus, when the planar inductor is mounted on the same circuit board surface as that on which other parts are mounted, the area for arranging the power supply cannot be decreased. In recent years, a hybrid IC type dc-to-dc converter using a multilayered ferrite transformer formed by a printing technique ('92 Japan Switching Power Supply System Symposium). However, when the printing technique is used, the thickness of a coil conductor constituting the transformer cannot be increased, the coil resistance increases. As a result, the dc-to-dc converter can receive only about 1 W, and therefore is not suitable for a high-power application. Further, when parts are to be mounted at a higher density to decrease the size of a power supply, heat conduction from the power supply poses a serious problem. Since a heat conduction effect is dependent on the surface area of temperature rise, a high power has a trade off relationship with a decrease in size. Therefore, a compact, high power supply has been demanded.

Figure 28:
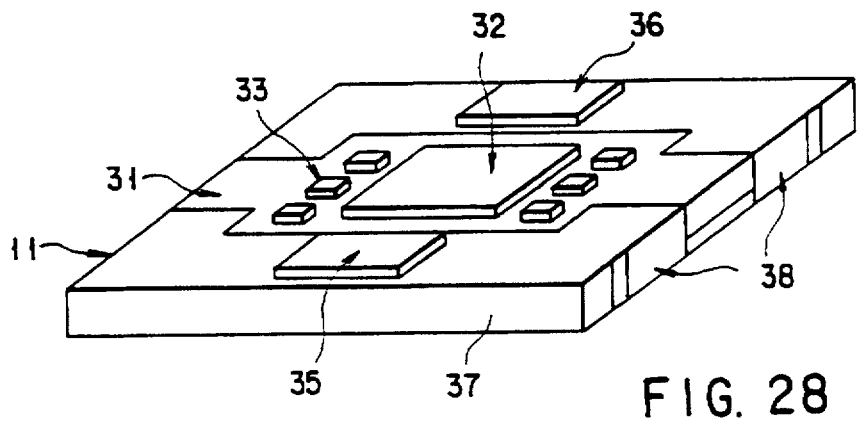
FIG. 28 is a perspective view showing a hybrid IC type dc-to-dc converter according to Example 4.
Figure 29:
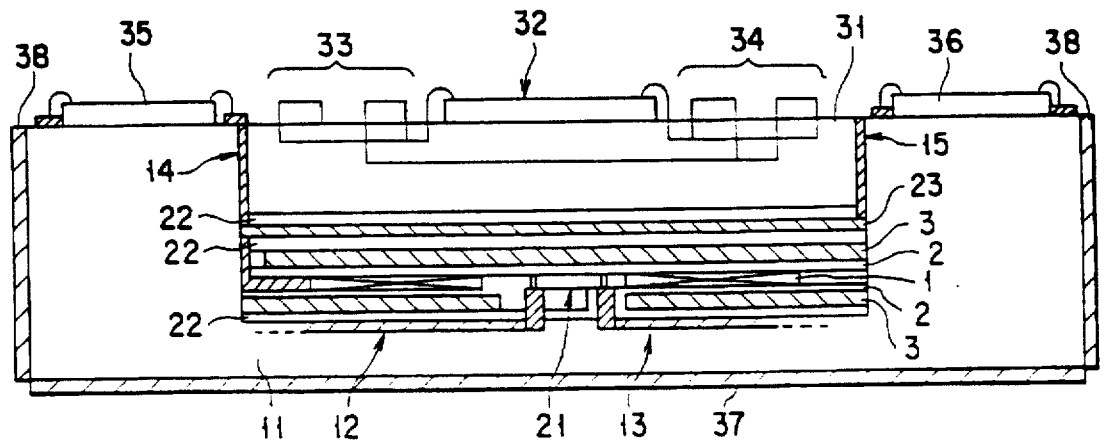
FIG. 29 is a sectional view showing the hybrid IC type dc-to-dc converter in FIG. 28.
Figure 30:
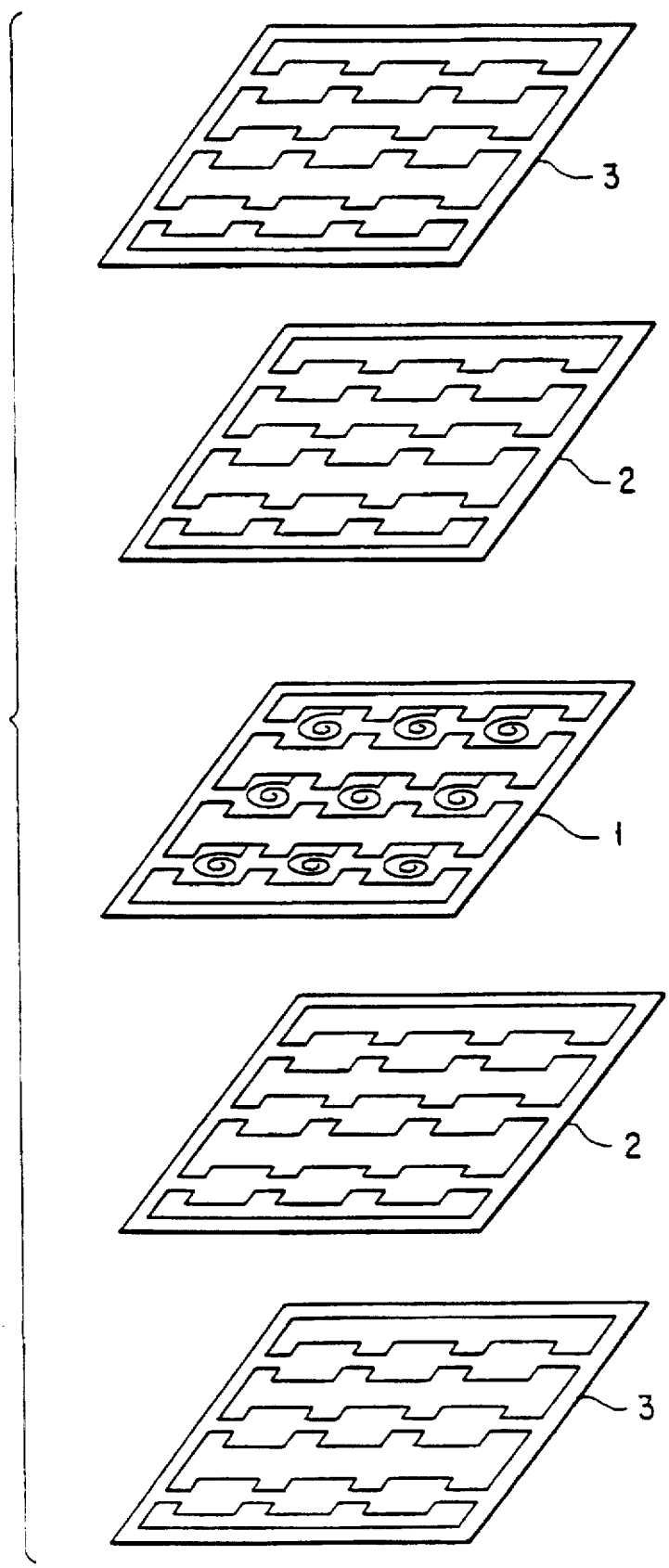
FIG. 30 is an exploded perspective view showing a planar inductor constituting the hybrid IC dc-to-dc converter in FIG. 28.
Figure 31:
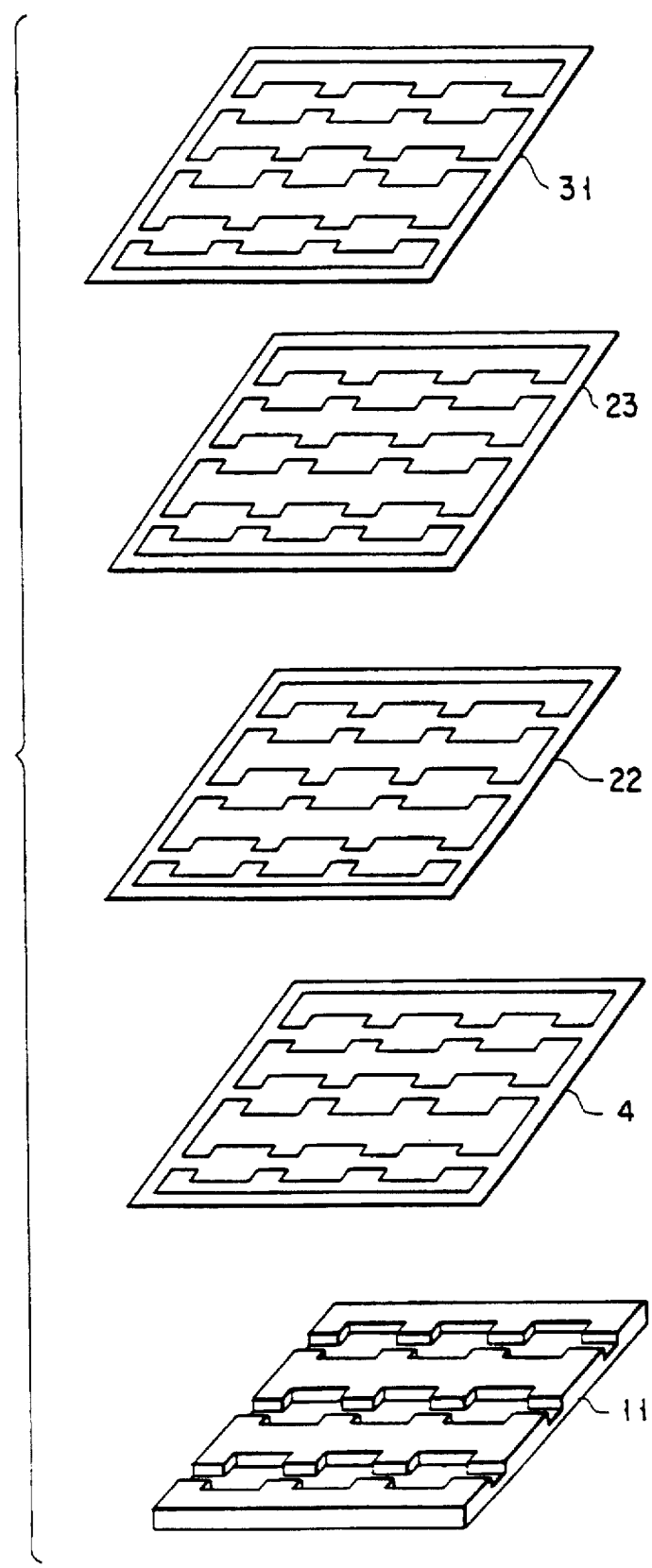
FIG. 31 is an exploded perspective view showing members buried in a recessed portion of the highly heat-conductive insulating substrate of the hybrid IC type dc-to-dc converter in FIG. 28.
Figure 32A:
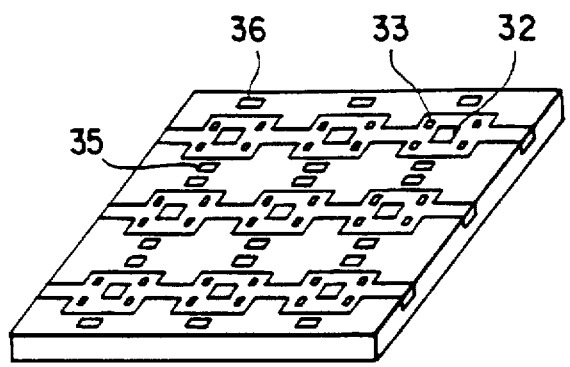
FIGS. 32A to 32D are perspective views showing the steps from the mounting step on the surface of the highly heat-conductive insulating substrate of the hybrid IC type dc-to-dc converter in FIG. 28.
Figure 32B:
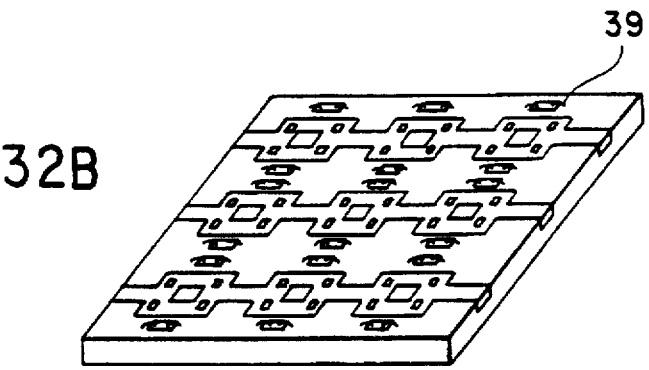
Figure 32C:
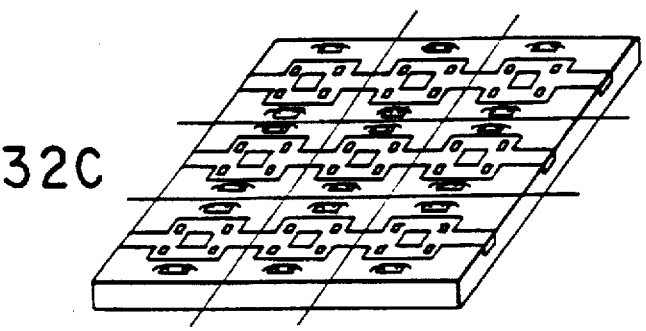
Figure 32D:
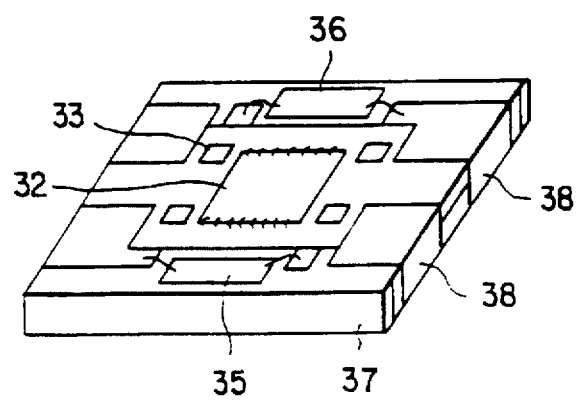
Figure 33:
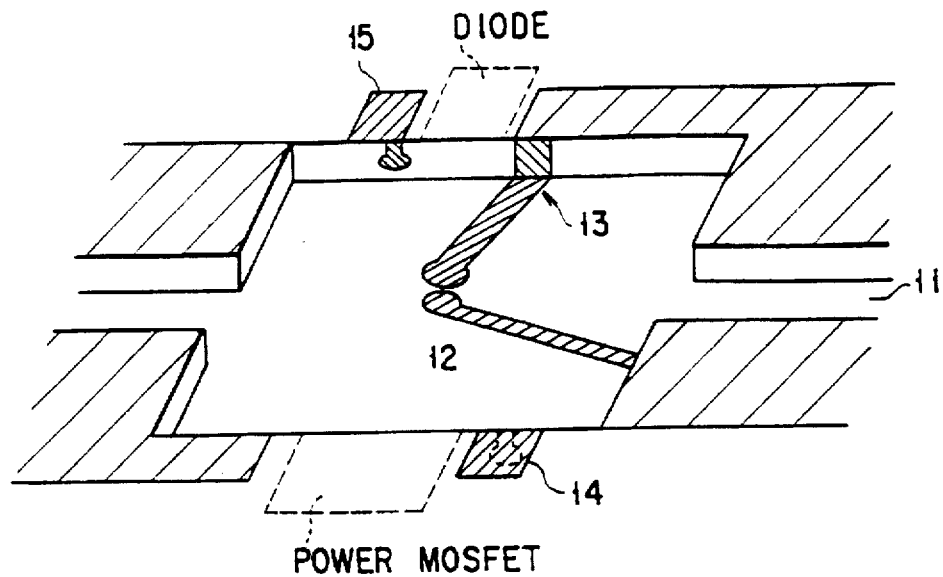
FIG. 33 is a perspective view showing a recessed portion of the highly heat-conductive insulating substrate constituting the hybrid IC type dc-to-dc converter in FIG. 28.
Figure 34:
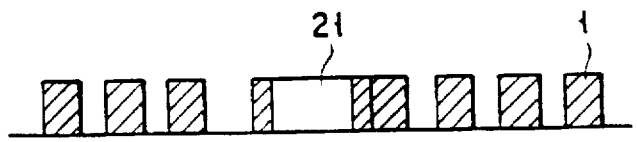
FIG. 34 is a sectional view showing the connection state between a planar inductor and a multilayered ceramic capacitor constituting the hybrid IC type dc-to-dc converter in FIG. 28.

FIG. 28 is a perspective view showing a hybrid IC type dc-to-dc converter in this Example, FIG. 29 is a sectional view showing the hybrid IC type dc-to-dc converter in FIG. 28, FIG. 30 is an exploded perspective view showing planar inductors, FIG. 31 is an exploded perspective view showing parts buried in a recessed portion of a highly heat-conductive insulating substrate, FIGS. 32A to 32D are perspective view showing the steps from the mounting step on the surface of a highly heat-conductive insulating substrate, FIG. 33 is a perspective view showing the recessed portion of the highly heat-conductive insulating substrate, FIG. 34 is a sectional view showing the connection state between the planar inductor and a multilayered ceramic capacitor, and FIG. 35 is a circuit diagram showing a hybrid dc-to-dc converter according to this Example. As shown in FIG. 35, the circuit arrangement of the dc-to-dc converter in this Example is of a buck chopper type.

A recessed portion is formed in part of a highly heat-conductive insulating substrate 11. In the recessed portion of this insulating substrate 11, conductor patterns 12 and 13 are formed on the bottom surface, and conductor patterns 14 and 15 are formed on the side surfaces (see FIG. 33). Note that the insulating substrate 11 is obtained such that a green sheet is formed with a pattern of periodical recessed portions respectively corresponding to circuit units and then the green sheet is sintered (see FIG. 31).

FIG. 30 shows planar inductors buried in the recessed portions of the insulating substrate 11. This planar inductor has a structure in which a sheet for a soft magnetic layer 3, a sheet for an insulating layer 2, a coil sheet on which spiral coils 1 are formed, a sheet for the insulating layer 2, and a sheet for the soft magnetic layer 3 are sequentially stacked. These sheets have shapes corresponding to the recessed portions of the insulating substrate 11. As the sheet for the soft magnetic layer 3, a multilayer consisting of a soft magnetic material may be used. In addition, proper slits may be formed in the direction perpendicular to the direction of a magnetic flux to reduce an eddy-current loss. These members are formed by punching, etching, or the like.

A multilayered ceramic capacitor 21 is formed in a space of the central portion of each of the spiral coils 1 of the coil sheet, and one electrode of the multilayered ceramic capacitor 21 is electrically connected to the terminal of the central portion of the corresponding spiral coil 1 (see FIG. 34). Although not shown, a through hole for connecting a terminal is formed in the insulating sheet and the soft magnetic sheet under the coil sheet. The multilayered ceramic capacitor 21 may be arranged in a space of the peripheral portion of each of the spiral coils.

FIG. 31 shows members including the planar inductors to be buried in the recessed portions of the insulating substrate 11. That is, a sheet for a planar inductor 4, a sheet for an insulating layer 22, a sheet for a magnetic shield layer 23, and a sheet for a wiring multilayer 31 are sequentially stacked, and these sheets have the shapes corresponding to the recessed portions of the insulating substrate 11. Note that, in FIG. 31, several insulating layers 22 shown in FIG. 29 are not illustrated. The upper surface of the wiring multilayer 31 and the upper surface of the highly heat-conductive insulating substrate 11 are formed on the same plane.

As shown in FIG. 29, the contact point between the electrode of the central portion of each of the spiral coils of the planar inductor 4 and one electrode of the corresponding multilayered ceramic capacitor 21 is connected to the conductor pattern of the insulating substrate 11, and the other electrode of the multilayered ceramic capacitor 21 is connected to the conductor pattern 12. The electrode of the peripheral portion of each of the spiral coils 1 is connected to the corresponding conductor pattern 14 of the insulating substrate 11. The magnetic shield layer 23 interrupts the electromagnetic coupling between the planar inductor 4 and the above circuit to shield the leakage electromagnetic field of the planar inductor 4. This magnetic shield layer 23 is also used as a conductor for connecting the conductor patterns 14 and 15 to each other.

In this manner, when the planar inductor 4 and the multilayered ceramic capacitor 21 are combined to each other, a space for mounting can be decreased. Since both the planar inductor 4 and the multilayered ceramic capacitor 21 are formed on the highly heat-conductive insulating substrate 11, excellent heat dissipation can be performed. As shown in FIGS. 31 and 32, the recessed portions of the highly heat-conductive insulating substrate 11 can be used as positioning guides when the sheet-like members are stacked. For this reason, the members can be easily stacked, and productivity can be improved.

The mounting steps from the above step will be described below with reference to FIGS. 32A to 32D. As shown in FIG. 32A, power MOSFETs 35 and diodes 36 are mounted on the projecting portions of the highly heat-conductive insulating substrate 11, and PWM control ICs 32 and external parts 33 and 34 such as resistors, capacitors, gate drivers are mounted on the upper surface of the wiring multilayer 31. As these parts, bare chips are used. As shown in FIG. 32B, the parts are connected to the conductor patterns by bonding wires 39. Note that, as each part, a surface mounting part which is resin-molded may be used. Thereafter, the entire surface of the resultant structure is covered with a protective resin film. In addition, as shown in FIG. 32C, dc-to-dc converters are cut one by one. Finally, as shown in FIG. 32D, ground electrodes 37 are formed by plating on the bottom and side surfaces of the highly heat-conductive insulating substrate 11, and external electrodes 38 are formed by plating on the surfaces except for the surfaces on which the ground electrodes are formed. In this manner, the hybrid IC type dc-to-dc converter shown in FIGS. 28 and 29 can be manufactured.

In the hybrid IC type dc-to-dc converter according to the present invention, a mounting density can be increased because the planar inductor or the like having a large area is buried in the recessed portion of the highly heat-conductive insulating substrate. Since all the power parts are mounted in direct contact with the highly heat-conductive insulating substrate, excellent heat dissipation can be performed, and the dc-to-dc converter can cope with a high-power application. In addition, since the external and ground electrodes are formed on the side surfaces of the highly heat-conductive insulating substrate, excellent surface mounting properties can be obtained. When a magnetic shield layer is formed, electromagnetic noise to the outside of the dc-to-dc converter can be reduced.

Various planar magnetic elements and semiconductor elements may be used in the hybrid IC type dc-to-dc converter described in this Example.

Example 5

In Example 5, an improvement of a dc-to-dc converter having an inductive load circuit including a switching element for causing a current to flow an inductive load and an MOSFET diode for regenerating energy accumulated in the inductive load.

Figure 36:
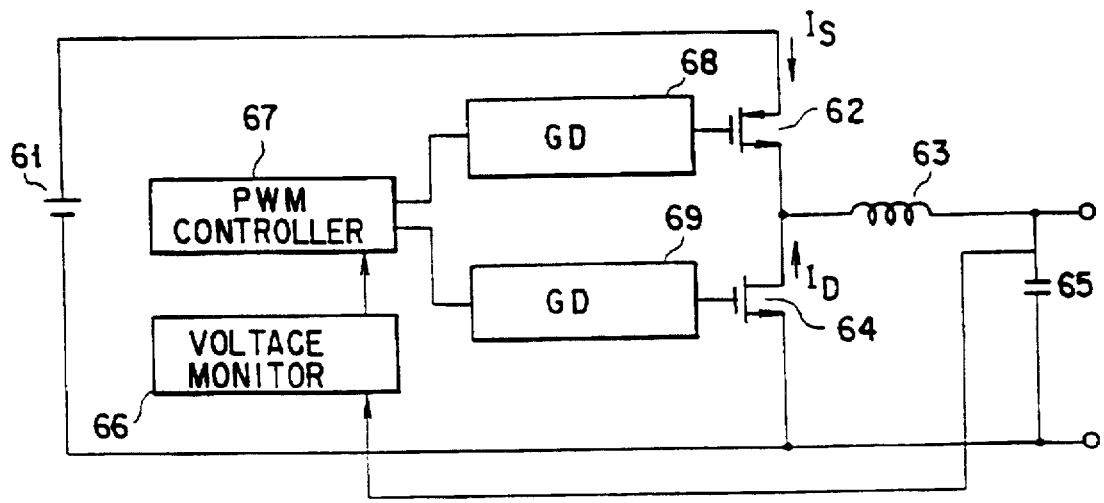
FIG. 36 is a circuit diagram showing a general dc-to-dc converter.

FIG. 36 shows a dc-to-dc converter. This dc-to-dc converter is constituted by a main power supply 61, a switching element 62, an inductor 63, an MOSFET diode 64, an output capacitor 65, a voltage monitor circuit 66, a control circuit 67, a driver circuit 68 for the switching element, and a driver circuit 69 for the MOSFET diode.

This dc-to-dc converter is operated as follows. The voltage monitor circuit 66 monitors the voltage of the output capacitor 65 to input the obtained monitor signal to the control circuit 67. When the voltage of the output capacitor 65 obtained by the monitor signal is lower than a predetermined voltage, the driver circuit 68 receives a wide pulse signal to drive the switching element 62. Therefore, an average current increases, and the voltage of the output capacitor 65 is boosted. In contrast to this, when the voltage of the output capacitor 65 is higher than the predetermined voltage, the width of the pulse signal is decreased to drive the switching element 62. Therefore, the average current decreases, and the voltage of the output capacitor 65 drops. In this manner, in this dc-to-dc converter, a constant voltage is obtained from the output capacitor 65 by so-called pulse-width modulation in which the width of a pulse signal for driving the switching element 62 is controlled.

In a dc-to-dc converter, the losses of the constituent parts must be decreased to obtain a high efficiency. For example, referring to FIG. 36, as a diode for regenerating energy accumulated in an inductor, a p-n junction diode is not used, but the MOSFET diode 64 is used to decrease the energy loss. This is because the following two problems are posed when the p-n junction diode is used.

First, since a p-n junction diode has a built-in voltage, when a current flows in the p-n junction, a voltage higher than the built-in voltage is always generated by the p-n junction diode. In a p-n junction diode using silicon, a built-in voltage of 0.6 to 0.7V is generated. Therefore, when a current of, e.g., 1A, flows in the p-n junction diode, a loss of 0.6 W or more occurs. Second, since a p-n junction diode is operated as a bipolar element, carriers are accumulated in the p-n junction diode. As a result, when a reverse voltage is applied to the p-n junction diode set in an ON state, a reverse current flows in the p-n junction diode. This state is set each time a switching element is turned on. The reverse current flowing at this time is a reactive current to cause a loss of the device.

On the other hand, the MOSFET diode set in an ON mode functions as a resistor. Therefore, when an MOSFET diode having a low ON resistance is used, a loss smaller than that obtained when a p-n junction diode is used can be achieved. For this reason, upon removal of a gate drive signal, even if a reverse voltage is applied to the MOSFET diode, no reverse current flows. Therefore, when the MOSFET diode is used, the loss can be decreased, and the device can have a high efficiency.

However, the MOSFET diode has a parasitic p-n junction diode in its structure. For this reason, when a potential difference generated by the MOSFET diode functions as a resistor in an ON mode exceeds the built-in voltage of the parasitic p-n junction diode and thus a current flows, the parasitic p-n junction diode operates. As a result, as in the above description, when a reverse voltage is applied to the MOSFET diode set in an ON state, a reverse current flows to increase the loss.

In this Example 5, the loss is decreased not to operate the parasitic p-n junction diode of the MOSFET diode. The MOSFET diode according to this Example will be described in detail below with reference to the accompanying drawings.

Figure 37:
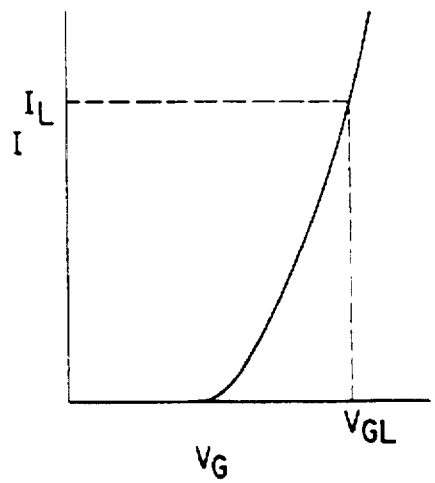
FIG. 37 is a graph showing the relationship between the gate voltage and ON current of the switching element of the dc-to-dc converter in FIG. 36.
Figure 38:
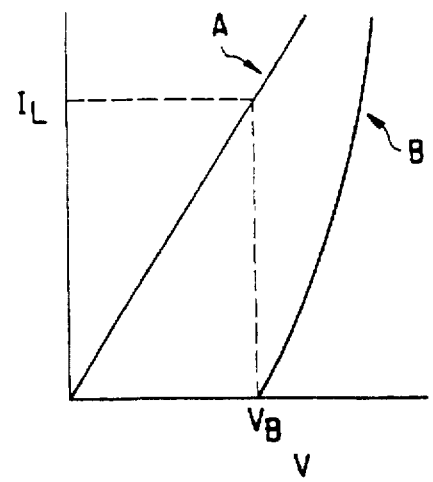
FIG. 38 is a graph showing the relationship between the ON voltage and current Of the MOSFET diode of the dc-to-dc converter in FIG.

FIG. 37 shows the relationship between the gate voltage and ON current of an MOSFET diode used as the switching element 62 of the dc-to-dc converter in FIG. 36. This MOSFET diode has a gate voltage which is set to be $V_{GL}$ such that the maximum ON current is set to be $I_L$. In this case, the maximum ON current $I_L$ of the switching element is determined on the basis of FIG. 38. Referring to FIG. 38, reference symbol A denotes a curve indicating the relationship between a current flowing in the MOSFET diode and a potential difference generated by the current, and reference symbol B denotes a curve indicating the relationship between a voltage higher than a built-in voltage $V_B$, which is applied to the parasitic p-n junction diode and a current flowing due to the voltage. In this figure, supposing that a current obtained when the potential difference generated in the MOSFET diode reaches the built-in voltage $v_B$ of the parasitic p-n junction diode is represented by $I_{LD}$, the ON current $I_L$ is set to be smaller than the current $I_{LD}$.

In order to realize this, for example, a drive signal is given such that a current flowing in the switching element is saturated near the built-in voltage of the parasitic p-n junction diode in the MOSFET diode.

Figure 39A:
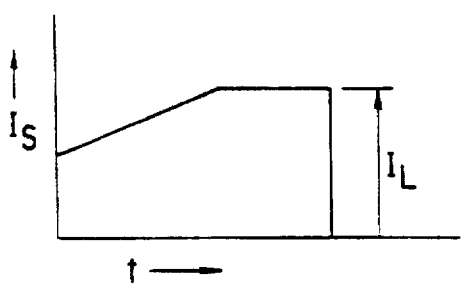
FIG. 39A is a graph showing the current waveform of a switching element in a method in Example 5 of the present invention.
Figure 39B:
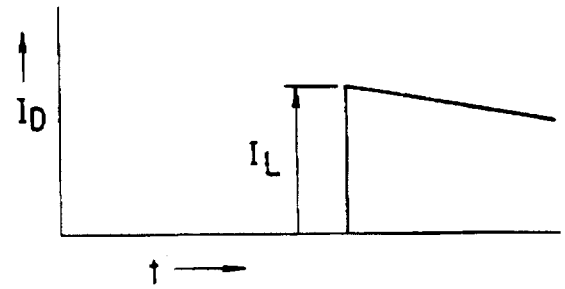
FIG. 39B is a graph showing the current waveform of an MOSFET diode in the method in Example 5.

FIG. 39A shows a current flowing in the switching element, and FIG. 39B shows a current flowing in the MOSFET diode. As shown in FIGS. 39A and 39B, the maximum value of the current flowing in the MOSFET diode is almost equal to that of a current obtained immediately before the switching element is turned off. When the switching element is driven in this manner, the current flowing in the MOSFET diode can be set smaller than the current $I_{LD}$ obtained when the potential difference reaches the built-in voltage $V_B$ of the parasitic p-n junction diode. Therefore, the parasitic junction diode is not operated.

when the potential difference generated by a regeneration current of the MOSFET diode is close to the built-in voltage of the parasitic p-n junction diode in the MOSFET diode, an increase in pulse width of the switching element may be stopped.

Figure 40:
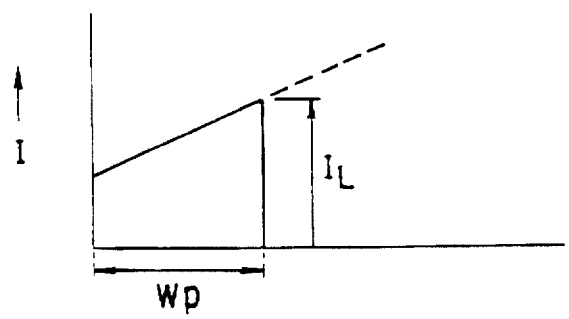
FIG. 40 is a graph showing the relationship between the pulse width and current of the switching element to explain the method in Example 5 of the present invention.

FIG. 40 shows the relationship between the pulse width and current of the switching element. When a current flows in an inductor as a dc-to-dc converter, as shown in FIG. 40,
the current increases in proportion to the pulse width. In this case, the maximum pulse width Wp is set such that the maximum current $I_L$ flowing in the switching element is set smaller than the current $I_{LD}$ corresponding to the built-in voltage of the p-n junction diode shown in FIG. 38. When the switching element is driven as described above, the parasitic junction diode is not operated.

In addition, the ON resistance of the MOSFET diode may be set smaller than the quotient between the built-in voltage of the parasitic p-n junction diode and the maximum current flowing in the inductor. In this case, the maximum value of the current flowing in the MOSFET diode is almost equal to the maximum current flowing in the inductor. The maximum value of a potential difference generated in this manner is obtained by the product between the ON resistance of the MOSFET diode and the maximum current flowing in the MOSFET diode, and this value does not exceed the built-in voltage of the parasitic p-n junction diode. Therefore, the parasitic p-n junction diode is not operated.

As described above, when the method according to Example 5 is used, the parasitic p-n junction diode of the MOSFET diode is not operated. Therefore, even when a reverse voltage is applied to the MOSFET diode set in an ON state, no reverse current flows in the MOSFET diode, and the loss can be decreased.

Example 6

In Example 6, an improvement of an MOSFET diode for regenerating energy accumulated in an inductive load will be described below.

In the above dc-to-dc converter in FIG. 36, the MOSFET diode 64 is turned off immediately after the switching element 62 is turned off, thereby regenerating energy accumulated in the inductor 63. However, it is difficult to synchronize turn-off of the switching element and turn-on of the MOSFET diode, and consequently, a small time difference is inevitable. This causes an disadvantage in that a forward voltage is applied to the MOSFET diode with the small time difference.

FIG. 41 shows a general MOSFET diode. This MOSFET diode is constituted by a p-type base layer 72 selectively formed in the surface of an n-type semiconductor substrate 71 having a high resistance, an n-type source layer 73 formed in the surface of the p-type base layer 72, an n-type drain layer 74 formed in the surface of the n-type semiconductor substrate 71 to oppose the n-type source layer 73, a gate electrode 75 formed, through an insulating film, on the surface of the p-type base layer 72 sandwiched by the n-type source layer 73 and the n-type drain layer 74, a source electrode 76 which is in ohmic contact with the p-type base layer 72 and the n-type source layer 73, and a drain electrode 77 which is in ohmic contact with the n-type drain layer 74.

In the MOSFET diode, a parasitic p-n junction diode constituted by the p-type base layer 72, and the n-type semiconductor substrate 71 and the n-type drain layer 74 is formed. For this reason, when a forward voltage is applied to the MOSFET diode, the parasitic p-n junction diode is operated, and a loss is increased due to the above reason.

According to Example 6, a Schottky diode having an ON voltage higher than that of the parasitic p-n junction diode is incorporated in the MOSFET diode to prevent the parasitic p-n junction diode from operating, thereby decreasing the loss.

Example 6 will be described in detail below with reference to the accompanying drawings.

FIGS. 42A and 42B show an MOSFET diode according to Example 6, in which FIG. 42A is a plan view showing the MOSFET diode and FIG. 42B is a sectional view showing the MOSFET diode along a line B–B' in FIG. 42A. This MOSFET diode is constituted by the p-type base layer 72 selectively formed in the surface of the n-type semiconductor substrate 71 having a high resistance, the n-type source layer 73 formed in the surface of the p-type base layer 72, the n-type drain layer 74 formed in the surface of the n-type semiconductor substrate 71 to oppose the n-type source layer 73, a gate electrode 75 formed, through an insulating film, on the surface of the p-type base layer 72 sandwiched by the n-type source layer 73 and the n-type drain layer 74, the source electrode 76 which is in ohmic contact with the p-type base layer 72 and the n-type source layer 73, and the drain electrode 77 which is in ohmic contact with the n-type drain layer 74. In addition, the source electrode 76 extends to the surface of the n-type semiconductor substrate 71 adjacent to the p-type base layer 72, and a Schottky junction 78 is formed on the surface. A Schottky diode is constituted by the Schottky junction 78, the n-type semiconductor substrate 71, and the n-type drain layer 74.

In the MOSFET diode having the above arrangement, when positive and negative voltages are applied to the source and drain, respectively, without supplying a drive signal to the gate, a current flows in the Schottky diode constituted by the Schottky junction 78, the n-type semiconductor substrate 71, and the n-type drain layer 74, and no current flows in the parasitic p-n junction diode constituted by the p-type base layer 72, the n-type semiconductor substrate 71, and the n-type drain layer 74. Therefore, energy accumulated in the inductance is regenerated through the Schottky diode with the time difference between time at which the switching element is turned off and time at which the MOSFET diode is turned off. When a positive drive voltage is supplied to the gate, a channel layer is formed in the surface of the p-type base layer 72 under the gate electrode 75, and the n-type source layer 73 and the n-type drain layer 74 are set in a conductive state having an ON voltage lower than that of the Schottky diode. All currents flow between the n-type source layer 73 and the n-type drain layer 74, and no current flows in the Schottky diode. Therefore, all regeneration currents flow through the MOSFET diode. In this manner, the parasitic p-n junction diode is not operated, and a high-speed operation can be performed, thereby decreasing a loss.

In Example 6, the following various modifications are effected.

Figure 43A:
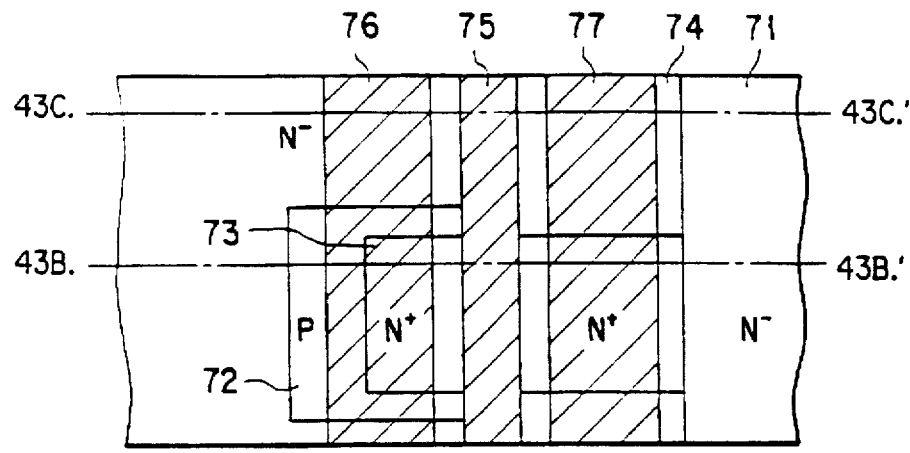
FIG. 43A is a plan view showing another MOSFET diode in Example 6 of the present invention.
Figure 43B:
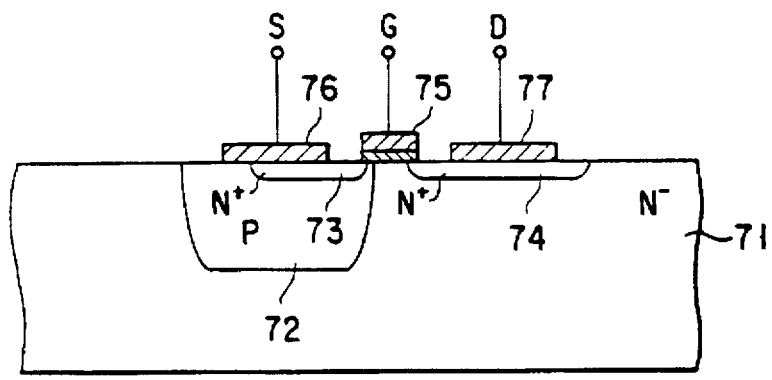
FIG. 43B is a sectional view showing the MOSFET diode along a line B–B' in FIG. 43A.
Figure 43C:
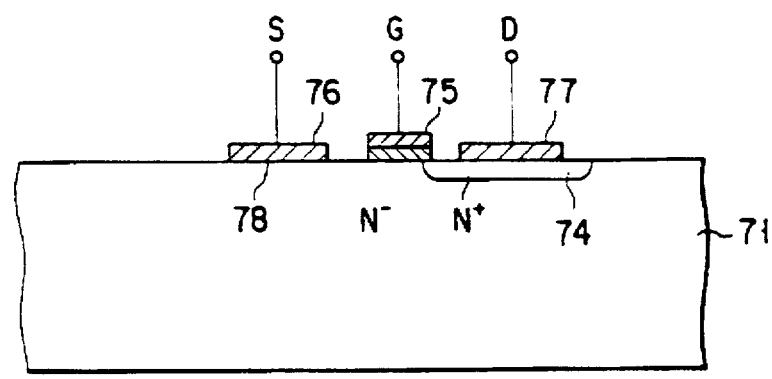
FIG. 43C is a sectional view showing the MOSFET diode along a line C–C' in FIG. 43A.

FIGS. 43A to 43C show another MOSFET diode, in which FIG. 43A is a plan view showing the MOSFET diode, FIG. 43B is a sectional view showing the MOSFET diode along a line B–B' in FIG. 43A, and FIG. 43C is a sectional view showing the MOSFET diode along a line C–C' in FIG. 43A. This MOSFET diode is different from the MOSFET diode in FIG. 42 in an island-like p-type base layer. In FIG. 42, since a Schottky diode current flows under the p-type base layer 72, the current path is increased in length, and the ON current is set large. On the other hand, as shown in FIG. 43C, since the p-type base layer 72 is not formed on the current path of the Schottky diode, the ON current can be decreased.

Figure 44A:
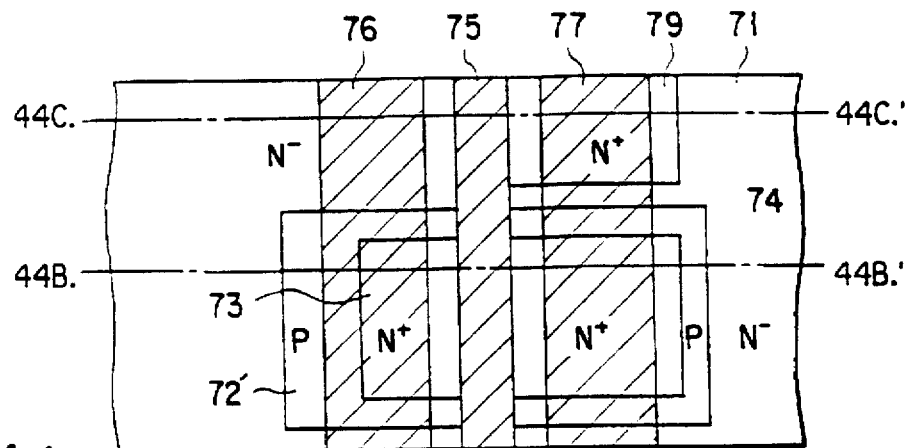
FIG. 44A is a plan view showing still another MOSFET diode in Example 6 of the present invention.
Figure 44B:
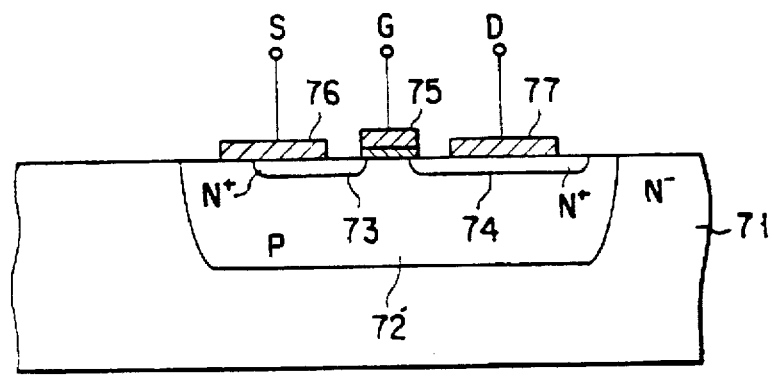
FIG. 44B is a sectional view showing the MOSFET diode along a line B–B' in FIG. 44A.
Figure 44C:
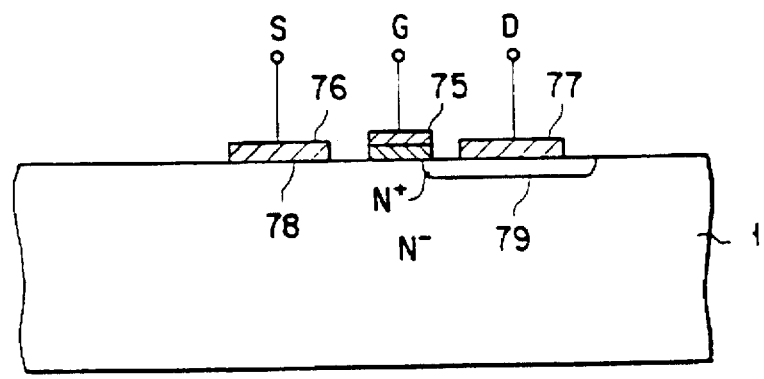
FIG. 44C is a sectional view showing the MOSFET diode along a line C–C' in FIG. 44A.

FIGS. 44A to 44C show still another MOSFET diode, in which FIG. 44A is a plan view showing the MOSFET diode, FIG. 44B is a sectional view showing the MOSFET diode along a line B–B' in FIG. 44A, and FIG. 44C is a sectional view showing the MOSFET diode along a line C–C' in FIG. 44A. In this MOSFET diode, the n-type source layer 73 and the n-type drain layer 74 are formed in a p-type well layer 72', an n-type contact layer 79 is formed adjacent to the well layer 72' in which the n-type drain layer 74 is formed, and the drain electrode 77 is formed on the surface of the n-type drain layer 74. This MOSFET diode can be manufactured in a small number of steps, and is effectively used for an element which does not require a high breakdown voltage.

Figure 45A:
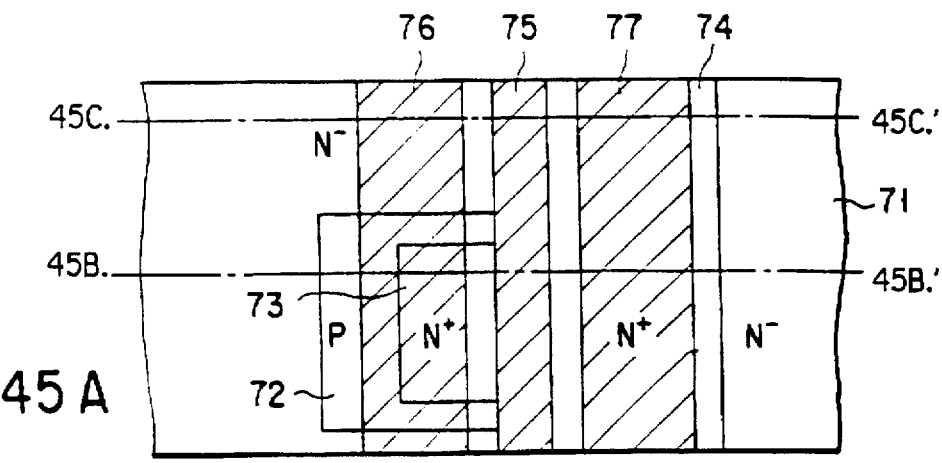
FIG. 45A is a plan view showing still another MOSFET diode in Example 6 of the present invention.
Figure 45B:
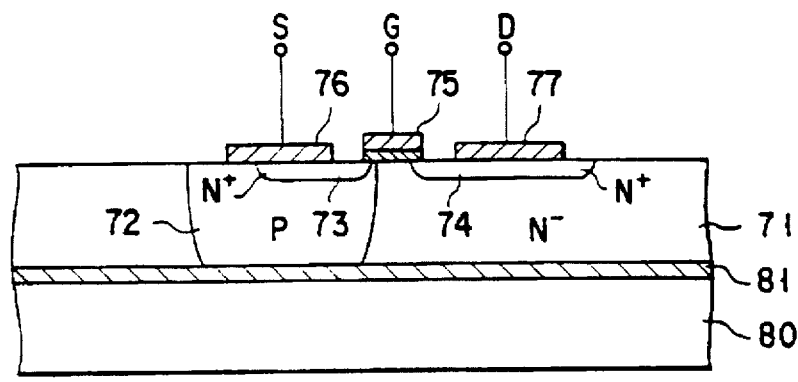
FIG. 45B is a sectional view showing the MOSFET diode along a line B–B' in FIG. 45A.
Figure 45C:
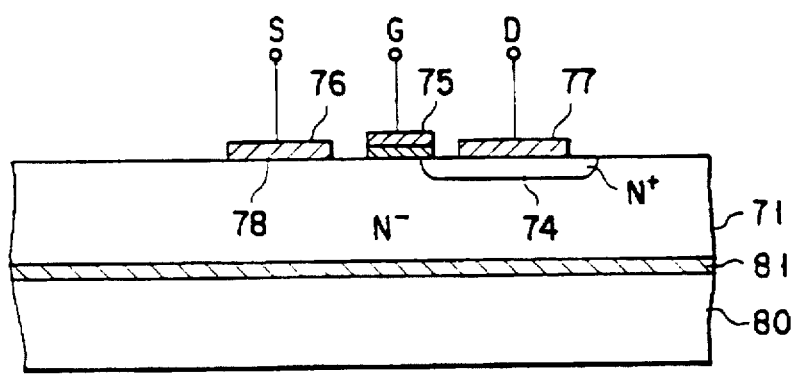
FIG. 45C is a sectional view showing the MOSFET diode along a line C–C' in FIG. 45A.

FIGS. 45A to 45C show still another MOSFET diode, in which FIG. 45A is a plan view showing the MOSFET diode, FIG. 45B is a sectional view showing the MOSFET diode along a line B–B' in FIG. 45A, and FIG. 45C is a sectional view showing the MOSFET diode along a line C–C' in FIG. 45A. This MOSFET diode is formed in the n-type semiconductor substrate 71 combined to another substrate 80 through an insulating film 81, i.e., a so-called dielectric isolation substrate. In addition, when the peripheral portion of the element is subjected to further dielectric isolation, the element can also be applied to an integrated circuit having a high breakdown voltage.

Figure 46A:
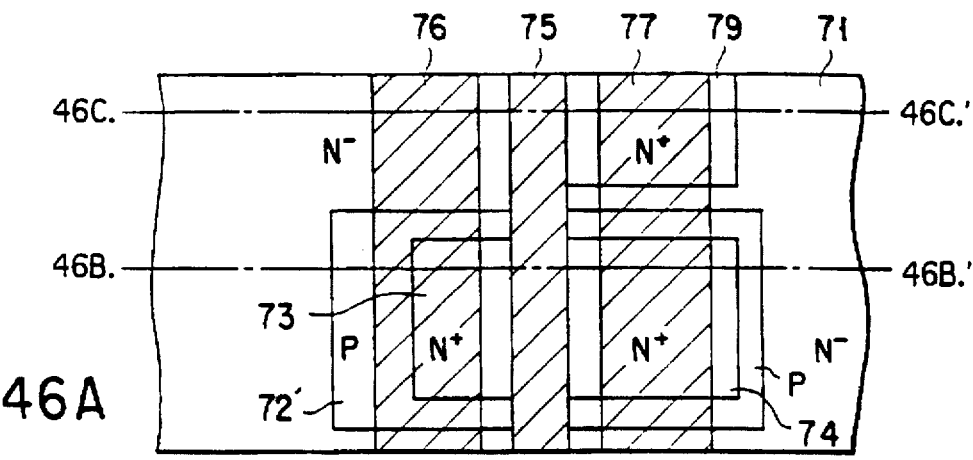
FIG. 46A is a plan view showing still another MOSFET diode in Example 6 of the present invention.
Figure 46B:
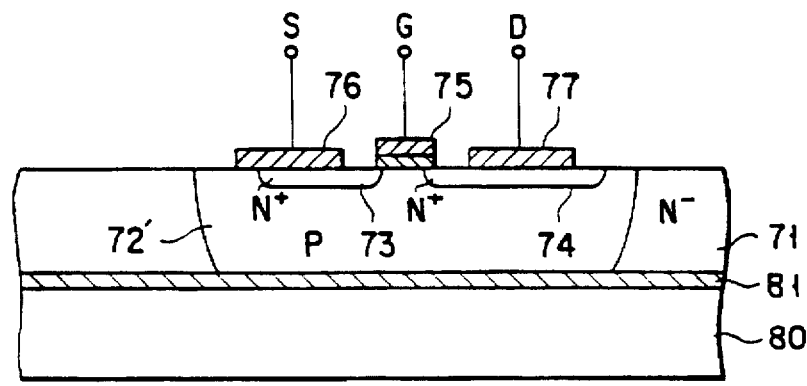
FIG. 46B is a sectional view showing the MOSFET diode along a line B–B' in FIG. 46A.
Figure 46C:
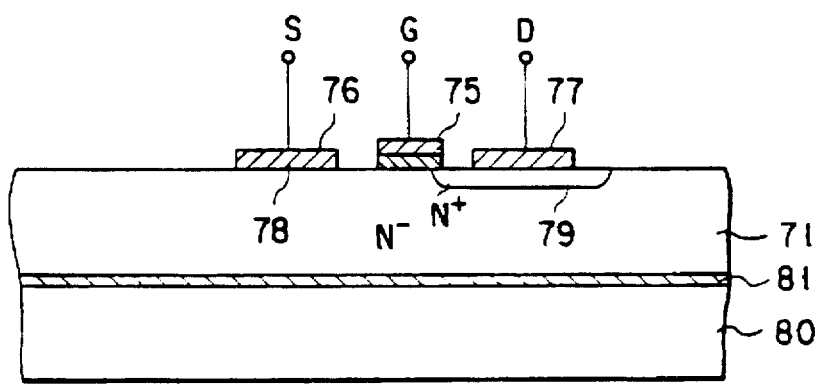
FIG. 46C is a sectional view showing the MOSFET diode along a line C–C' in FIG. 46A.
Figure 47A:
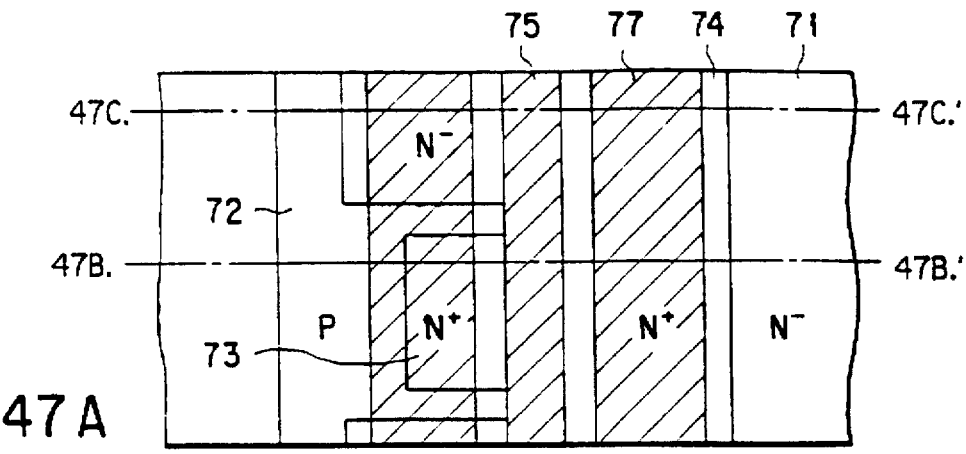
FIG. 47A is a plan view showing still another MOSFET diode in Example 6 of the present invention.
Figure 47B:
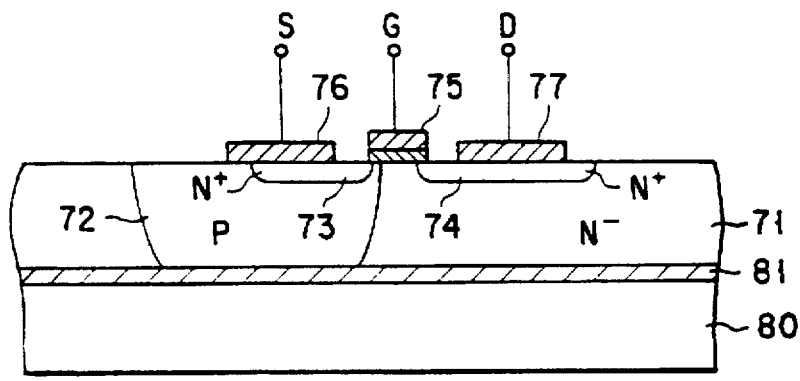
FIG. 47B is a sectional view showing the MOSFET diode along a line B–B' in FIG. 47A.
Figure 47C:
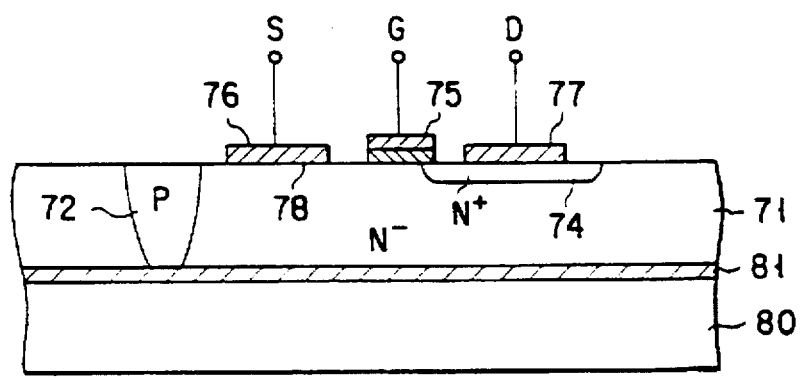
FIG. 47C is a sectional view showing the MOSFET diode along a line C–C' in FIG. 47A.

FIGS. 46A to 46C show still another MOSFET diode, in which FIG. 46A is a plan view showing the MOSFET diode, FIG. 46B is a sectional view showing the MOSFET diode along a line B–B' in FIG. 46A, and FIG. 46C is a sectional view showing the MOSFET diode along a line C–C' in FIG. 46A. This MOSFET diode is obtained by applying the structure in FIG. 44 to a dielectric isolation substrate. FIGS. 47A to 47C show still another MOSFET diode, in which FIG. 47A is a plan view showing the MOSFET diode, FIG. 47B is a sectional view showing the MOSFET diode along a line B–B' in FIG. 47A, and FIG. 47C is a sectional view showing the MOSFET diode along a line C–C' in FIG. 47A. In this MOSFET diode, the Schottky junction 78 is formed to be surrounded by the p-type base layer 72. In this arrangement, since a Schottky junction portion is pinched off by a depletion layer, an MOSFET diode having a high breakdown voltage can be realized.

In the MOSFET diode according to Example 6, the parasitic p-n junction diode is not operated, and a high-speed operation can be performed, thereby decreasing a loss.

Example 7

In Example 7, a bipolar switching element used in high-speed repetitive switching will be described.

As a high-speed bipolar transistor, a transistor having a stripe-like emitter structure is known. However, high-speed switching having deep saturation is disadvantageous in the loss of a base driver circuit.

Figure 48:
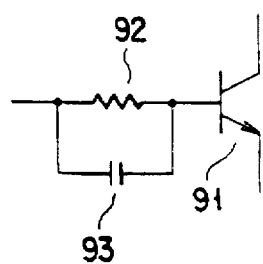
FIG. 48 is a circuit diagram showing a bipolar switching element.

A switching element whose switching speed is increased is known, as shown in FIG. 48, in which a resistor 92 and a speed-up capacitor 93 are connected to the base terminal of a bipolar transistor 91. However, when an external part such as the speed-up capacitor 93 is used, problems are posed in terms of space or cost.

In Example 7, a speed-up capacitor and a base resistor are integrally incorporated together with a bipolar transistor to decrease the load of a base driver circuit, thereby making high-speed switching possible.

Figure 49:
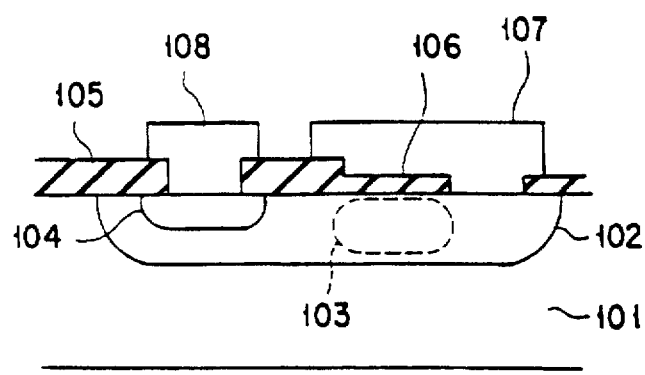
FIG. 49 is a sectional view showing a bipolar switching element in Example 7 of the present invention.

A bipolar switching element according to Example 7 will be described below with reference to FIG. 49. Referring to FIG. 49, a base region 102 is formed in the surface of a collector region 101, and a carrier accumulating region 103 having an impurity concentration lower than that of the base region 102 is formed in the base region 102. An emitter region 104 is formed in the surface of the base region 102. A thin oxide film 106 is formed on the surface of the base region 102 above the carrier accumulating region 103, and a thick oxide film 105 is formed on the remaining surface of the base region 102. In addition, these oxide films are partially etched to form contact holes, and a base electrode 107 and an emitter electrode 108 are formed.

In FIG. 49, the capacitor formed by sandwiching the thin oxide film 106 between the base electrode 107 and the carrier accumulating region 103 is equivalent to the speed-up capacitor 93 in FIG. 48. The carrier accumulating region 103 has almost the same function as that of the base resistor 93 in FIG. 48.

As described above, according to Example 7, a speed-up capacitor and a base resistor which are effective to high-speed driving are integrally incorporated together with a bipolar transistor. Therefore, an independent region isolated by an isolation region and used for an external part in a conventional IC is not required. Therefore, a compact switching transistor which has a base driver circuit having a small load and can be switched at a high speed can be realized.

Example 8

In Example 8, an application in which a power supply using a planar magnetic element as a constituent element is incorporated in a planar display panel will be described below.

Figure 50:
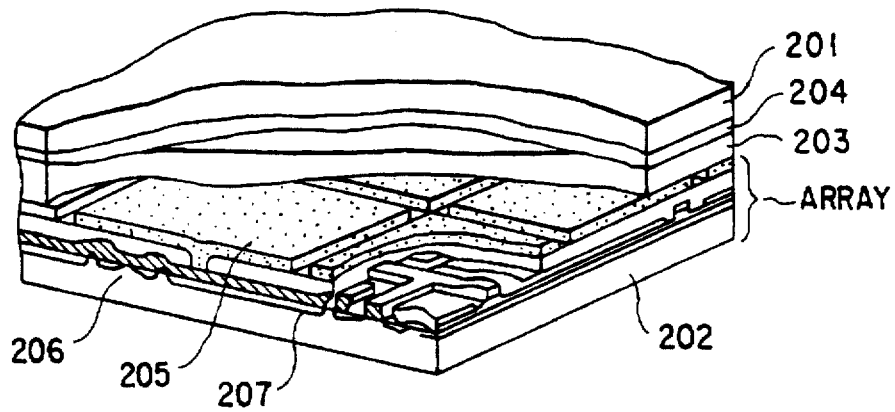
FIG. 50 is a view showing the schematic arrangement of a liquid crystal display panel.

FIG. 50 is a view showing the schematic arrangement of a liquid crystal display panel. A liquid crystal 203 is filled between two glass substrates 201 and 202. In order to apply a voltage to the liquid crystal 203, a transparent electrode 204 covering the entire surface of the liquid crystal panel and pixel electrodes 205 for respectively applying different voltages to pixels are arranged on the glass substrates 201 and 202, respectively. A thin film transistor 206 for applying a video signal voltage to each pixel is arranged for each pixel. The thin film transistor 206 is a field effect transistor consisting of amorphous silicon or polysilicon. The source side of the thin film transistor 206 is connected to the pixel electrode 205, the drain side is connected to a signal line electrode serving as a vertical drive line, and the gate is connected to a scanning line electrode serving as horizontal drive line. A signal accumulating capacitor 207 for holding a voltage applied to the liquid crystal for each pixel is formed in the liquid crystal cell of each pixel.

Figure 51:
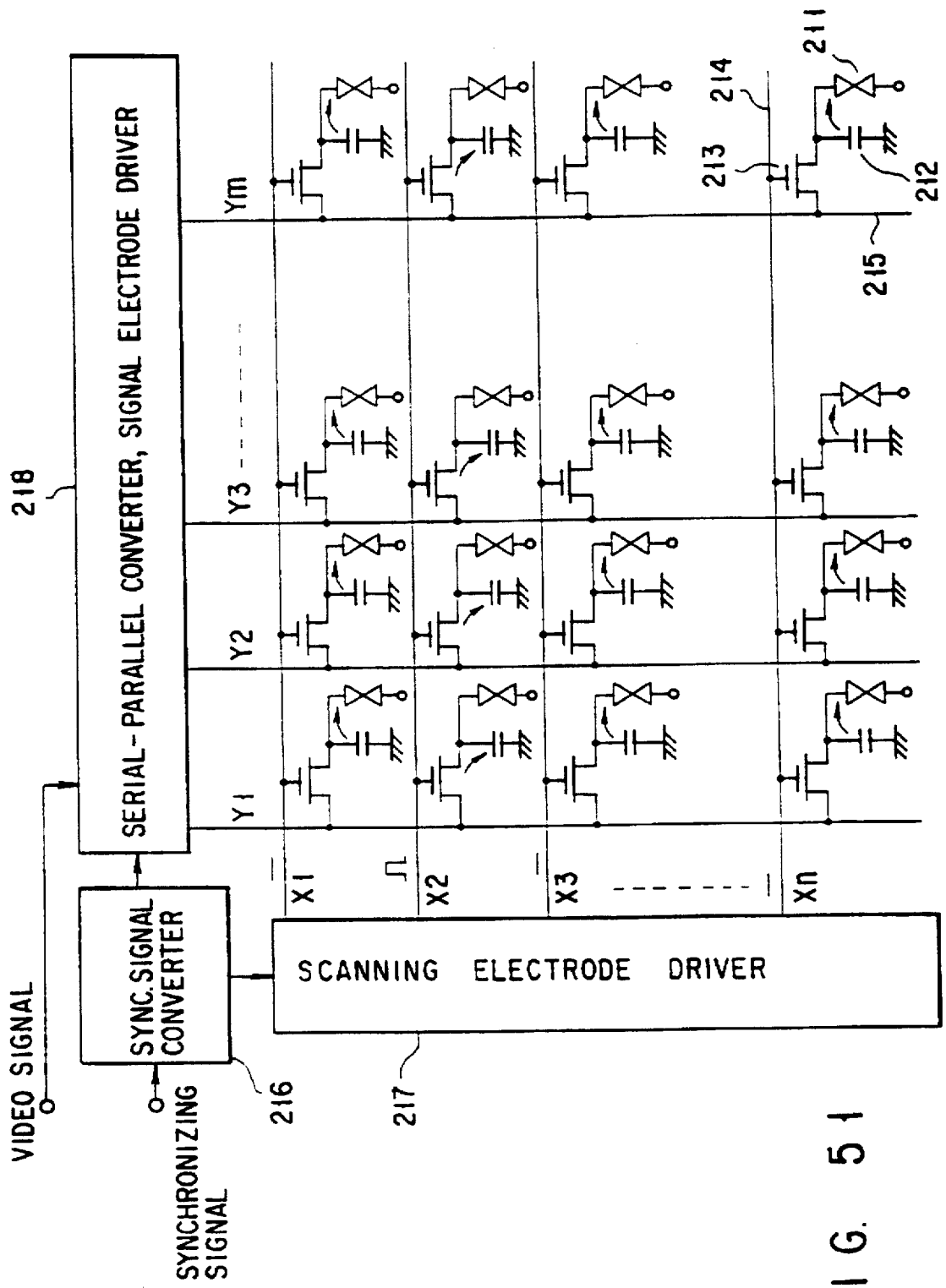
FIG. 51 is a circuit diagram for explaining the drive principle of the liquid crystal display panel.

FIG. 51 is a circuit diagram for explaining the drive principle of the liquid crystal display panel. A liquid crystal 211 is filled in the liquid crystal cell of each pixel, and a signal accumulating capacitor 212 for compensating for the capacitance of a pixel power supply unit is arranged to hold a voltage applied to the liquid crystal cell. The source of a thin film transistor 213 is connected through a pixel electrode (not shown) which is in contact with each liquid crystal filled portion. The drain side of the thin film transistor 213 is connected to a signal electrode (Y electrode) 215, and is driven by a signal electrode driver circuit 218. The gate side is connected to a scanning electrode (X electrode) 214, and is driven by a scanning electrode driver circuit 217.

The scanning electrode driver circuit 217 sequentially applies the high voltage pulse of about 26V to selected scanning electrodes every horizontal scanning period. In FIG. 51, a pulse is applied to a scanning electrode $X_2$. This scanning electrode driver circuit 217 is driven in synchronism with an output pulse from a sync signal converter 216 or converting a sync signal to a signal having a predetermined pulse width and a predetermined pulse phase. The gate of the thin film transistor 213 is connected to the scanning electrode 214, and a high voltage of 26V must be applied to the scanning electrode 214 to ON/OFF-operate the thin film transistor 213. This is because a voltage/current conversion efficiency $g_m$ of the thin film transistor 213 consisting of amorphous silicon is low.

The signal electrode driver circuit 218 is constituted by a serial-parallel converter for accumulating video signals corresponding to one horizontal scanning and time-serially sent through one line to rearrange the video signals in a line, and an output buffer for driving a signal electrode. This signal electrode driver circuit 218 is also driven in synchronism with an output pulse from the sync signal converter 216. The signal electrode driver circuit 218 requires a power supply voltage of 15V to drive the signal electrode with a video signal amplified to 10 $V_{pp}$ or more. In addition, since a logic circuit unit constituted by the scanning electrode driver circuit 217 and the signal electrode driver circuit 218 uses a 5-V operating circuit, the logic circuit unit requires a 5-V power supply.

The above driver circuits are mounted on a liquid crystal display panel. However, power supplies for applying voltages to the driver circuits are arranged outside the liquid crystal display panel. That is, according to a conventional technique, 5-V, 15-V and 26-V independent power supplies for applying the voltages to the driver circuits must be arranged outside a liquid crystal panel, and a power supply circuit to be incorporated in a flat television set or a personal computer having a liquid crystal display panel increases in size and is complicated, thereby increasing cost. The same problem as described above is posed in a flat display panel such as a plasma display panel or an EL display panel.

In Example 8, a high-voltage power supply generator is incorporated in a planar display panel, and the number of types of power supply voltages to be supplied is reduced, thereby simplifying a power supply unit. More specifically, horizontal and vertical pixel electrode driver circuits each constituted by a dc-to-dc converter using a planar magnetic element are mounted around a flat display panel.

Figure 52:
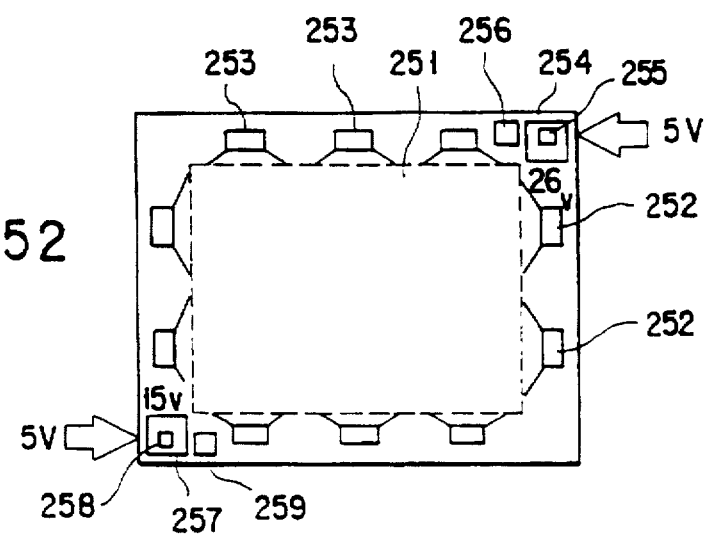
FIG. 52 is a view showing the mounting state of liquid crystal display panel incorporating a power supply in Example 8.

Example 8 will be described below in detail with reference to the accompanying drawings. FIG. 52 is a view showing the mounting state of a liquid crystal display panel incorporating a power supply according to Example 8. Scanning electrode driver circuits 252 are mounted on the left and right sides of a liquid crystal display panel 251. A scanning electrode drive LSI structure is constituted by four chips each having 120 output pins, and drives a total of 480 scanning electrodes. Signal electrode driver circuits 253 are mounted on the upper and lower sides of the liquid crystal display panel 251. A signal electrode drive LSI structure is constituted by 6 chips each having 120 pins, and drives a total of 720 signal electrodes. In this manner, the liquid crystal display panel is driven by the driver circuits arranged on the left, right, upper, and lower sides of the liquid crystal display panel due to the following reason. That is, the drive electrodes extending from the driver circuits are alternately arranged as an interdigital structure to increase the pitch of drive electrode terminals.

Each of these driver circuits is constituted by a monocrystalline silicon LSI, and is mounted by COG (Chip On Glass) mounting or TAB (Tape Automated Bonding) mounting. Note that driver circuits consisting of polysilicon may be directly incorporated in a glass substrate.

As described above, the driver circuits are arranged along the four sides of the liquid crystal display panel 251, and a 26-V power supply 254 used for the scanning electrode driver circuits and a 15-V power supply 257 used for the signal electrode driver circuit are mounted on the spaces of the corners of the liquid crystal display panel 251. These power supplies are dc-to-dc converters using planar inductors 255 and 258, respectively, and both the power supplies are operated by an input voltage of 5V. Control circuits 256 and 259 are mounted near the 26-V power supply 254 and the 15-V power supply 257, respectively.

Figure 53:
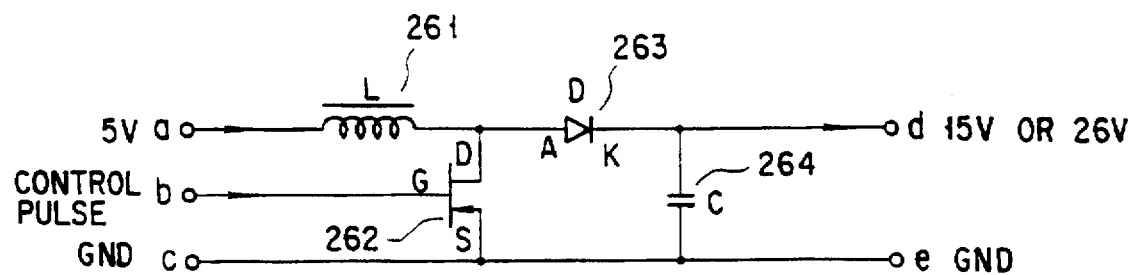
FIG. 53 is a circuit diagram showing a boost dc-to-dc converter used in the liquid crystal display panel incorporating the power supply in Example 8.

FIG. 53 is a circuit diagram showing a boost dc-to-dc converter. This boost dc-to-dc converter is constituted by a planar inductor 261 operating as a flyback coil, a switching transistor 262 for ON/OFF-operating a current, a rectifier diode 263, and a smoothing capacitor 264. An input voltage of 5V is applied to a terminal a, a control pulse having a rectangular waveform is input from the control circuit 256 or 259 shown in FIG. 52 to a terminal b. When the switching transistor 262 is turned on in response to a control pulse, a current flows in the planar inductor 261 to accumulate electromagnetic energy in the planar inductor 261. When the switching transistor 262 is turned off, the current flowing in the planar inductor 261 is interrupted, a high voltage pulse is generated across the planar inductor 261. The high voltage pulse is smoothed by the rectifier diode 263 and the smoothing capacitor 264, thereby obtaining a voltage of 15V or 26V higher than the input voltage.

Figure 54:
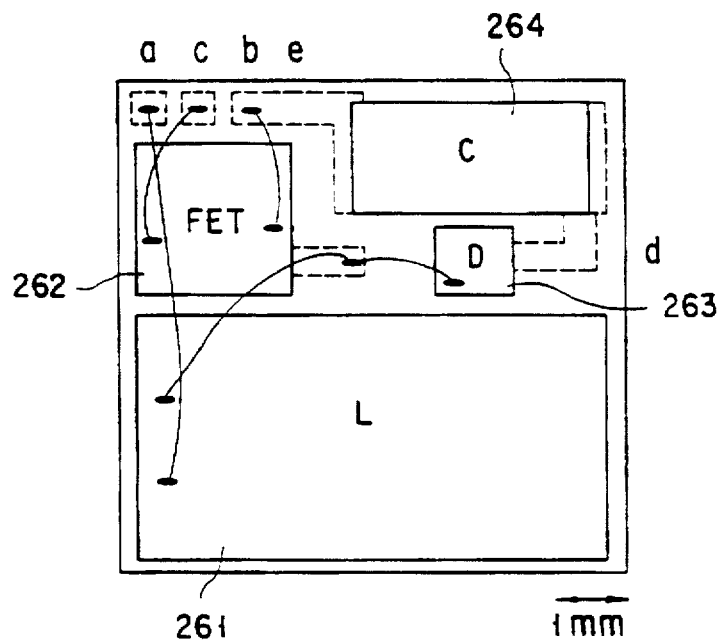
FIG. 54 is a plan view showing the arrangement of the parts of the dc-to-dc converter in FIG. 53.

FIG. 54 shows the arrangement of the parts of the dc-to-dc converter in FIG. 53. The parts except for the planar inductor 261, i.e., the switching transistor 262, the rectifier diode 263, and the smoothing capacitor 264 are constituted by planar chip parts. These parts can be mounted on an area of 7-mm square upon the substrate.

Figure 55A:
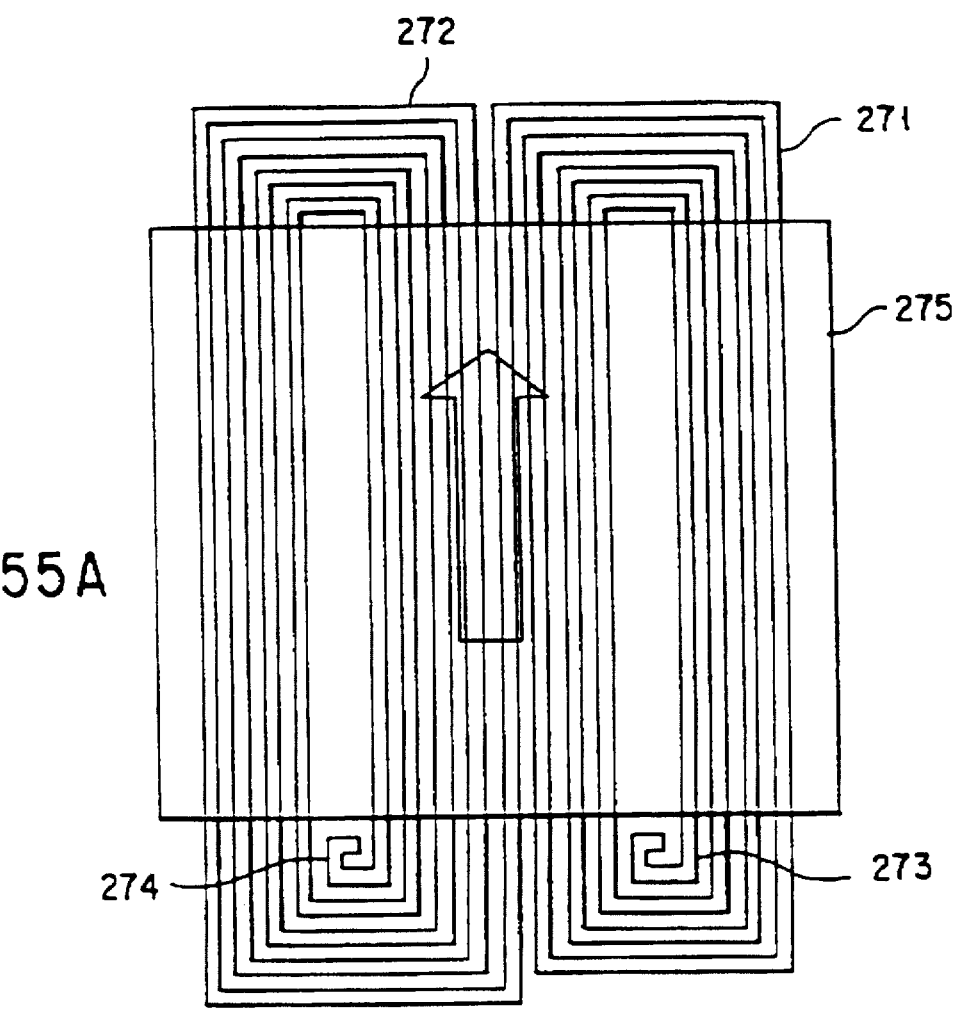
FIG. 55A is a plan view showing a planar inductor used in the liquid crystal display panel incorporating the power supply in Example 8.
Figure 55B:
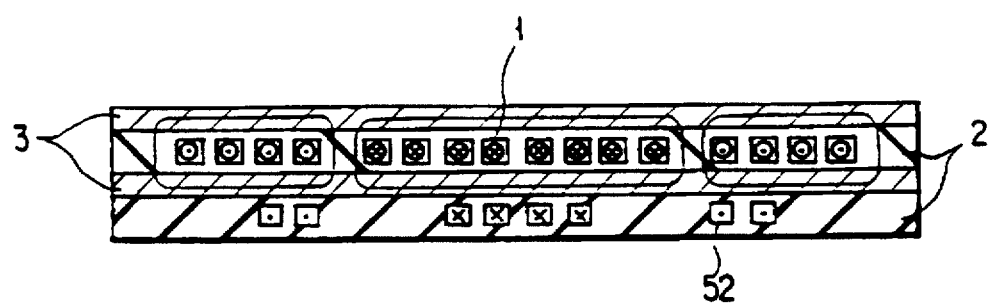
FIG. 55B is a sectional view showing the planar inductor in FIG. 55A.

FIG. 55A is a plan view showing the planar inductor used in Example 8, and FIG. 55B is a sectional view showing the planar inductor in FIG. 55A. The square spiral coils 271 and 272 are constituted by thick film conductors consisting of aluminum or copper, and the spiral coils 271 and 272 are wound in opposite directions and arranged adjacent to each other. The spiral coil 271 starting from a terminal 273 is wound counterclockwise and extends to be connected to the coil 272 which is wound clockwise, and the end of the spiral coil 271 is connected to a terminal 274. The spiral coils 271 and 272 are vertically sandwiched, through insulating layers, by soft magnetic layers 275 and 276 each having a uniaxial magnetic anisotropy. In FIG. 55A, the easy axis of magnetization is represented by an arrow. Magnetic fluxes generated by the coils 271 and 272 are generated in the directions of arrows in FIG. 55B and have the same phase to influence each other. For this reason, although the coils are not large, a relatively large inductance can be obtained by the effect of a mutual inductance when a uniaxial magnetic anisotropic soft magnetic layer is used to generate a magnetic flux in the hard axis of magnetization, a high-frequency eddy-current loss can be decreased. The planar inductor having the above structure can be formed to have a thickness of about 100 µm. As this planar inductor, the planar inductor shown in FIG. 9 can be used. In addition, a search coil is formed through the insulating layer.

Note that the arrangement of Example 8 can be applied to not only a liquid crystal display panel, but also, e.g., a plasma display panel requiring a high voltage of 200V to 300V for discharge driving, or an EL display panel requiring a high voltage of 100V to 200V for driving pixels to directly excite a fluorescent material in an electric field. When a power supply is incorporated in a flat display panel, the number of types of power supply voltages to be applied can be reduced. In addition, the power supply unit of a compact television set or personal computer using the flat display panel can be simplified, thereby providing a flat television set or personal computer having a smaller size.

Example 9

In Example 8, an application in which a power supply having a planar magnetic element as a constituent element is incorporated in a solid-state image pickup element used an a video camera or an electronic still camera will be described below.

FIG. 56 is a view showing the schematic arrangement of a solid-state image pickup device using a CCD image pickup element. Light which is incident on the image pickup lens 301 is focused on the image pickup surface of a CCD image pickup element 302. The CCD image pickup element 302 is driven by a pulse having predetermined voltage and frequency output from a horizontal driver circuit 303, a vertical driver circuit 304, or an electronic shutter driver circuit 305, and the CCD image pickup element 302 outputs photoelectrically converted charges as an electrical signal. An output signal from the CCD image pickup element 302 is converted into a video output signal through a signal processing circuit 307.

Each driver circuit is driven by four power supply voltages of −7V, 5V, 15V, and 25V applied from an external dc-to-dc converter 306. That is, in field shift in which a reading operation is performed from a photodiode to a vertical transfer CCD, a field pulse of 0V to 15V is applied to the vertical transfer CCD. In charge transfer operation in the vertical transfer CCD, a vertical transfer pulse of −7V to 15V is applied to the vertical transfer CCD. Therefore, a voltage of −7V to 15V is required to drive the vertical transfer CCD by a pulse. In electronic shutter mode, a high-voltage pulse of 25V is applied to the vertical transfer CCD to sweep the accumulated charges from the photodiode to the lower portion of the substrate. In addition, a transfer operation in a horizontal CCD is performed such that the horizontal CCD is driven by a pulse having a voltage of 0V to 5V. Further, a dc voltage of 15V is applied to the drain of the output transistor of a charge reading unit and the drain of a reset transistor for resetting charges every pixel, and a reset pulse of 5 $V_{pp}$ is applied to the gate of the reset transistor.

As described above, in a video camera or electronic still camera using the CCD image pickup element, a large number of different power supply voltages and pulses must be externally applied to the image pickup element, and the power supply unit of the image pickup device cannot be decreased in size.

According to Example 9, a booster for an image pickup device such as a video camera or electronic still camera using a CCD image pickup element is incorporated in the CCD image pickup element, and the number of types of power supply voltages to be applied is decreased, thereby simplifying the image pickup device.

Example 9 will be described below in detail with reference to the accompanying drawings.

Figure 57:
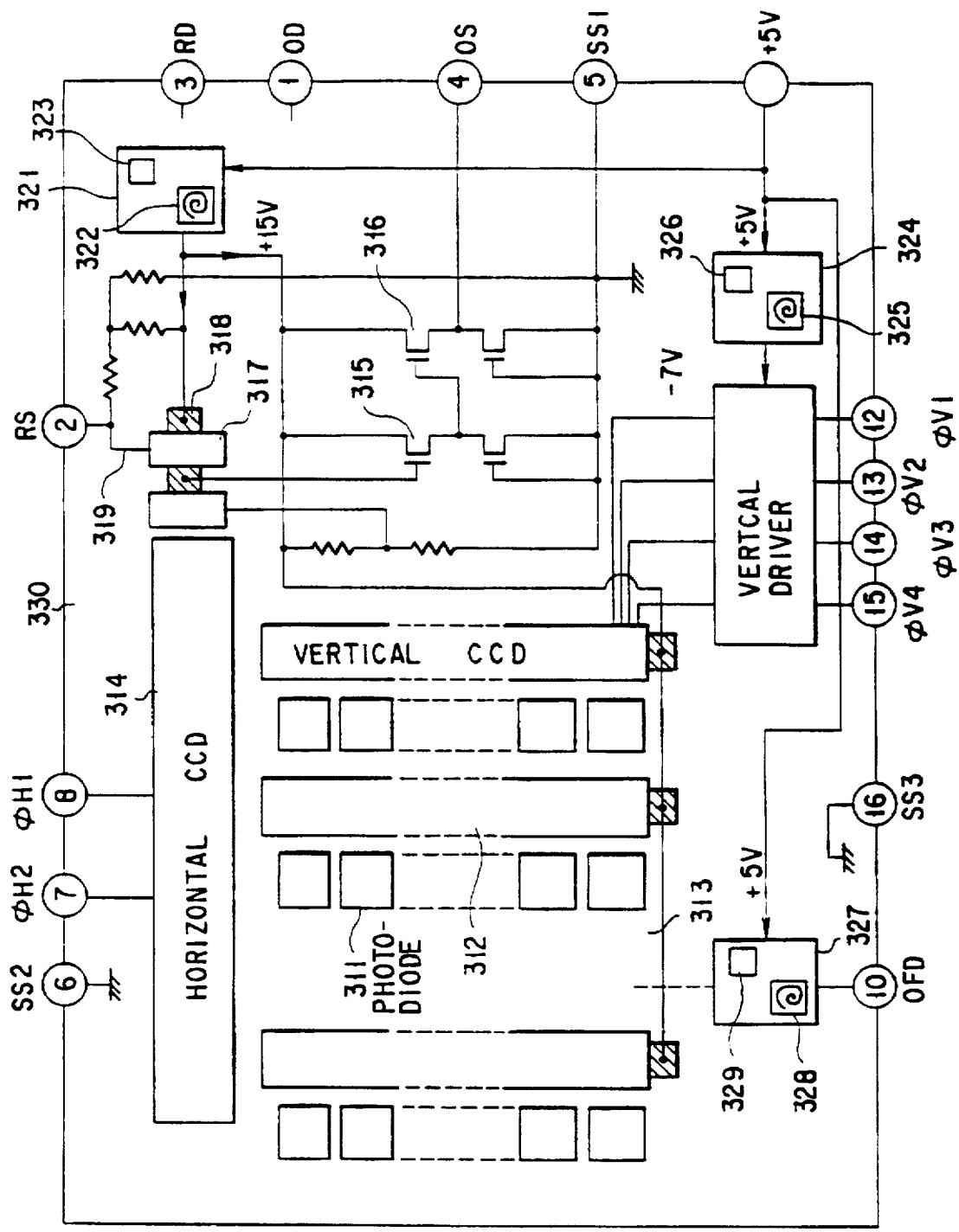
FIG. 57 is a view showing the schematic arrangement of a solid-state image pickup element incorporating a power supply according to Example 9.

FIG. 57 is a view showing the schematic arrangement of a CCD image pickup element incorporating a power supply according to Example 9. Incident light is photoelectrically converted into electrons by a photodiode 311, and charges are read to a vertical transfer CCD 312. At this time, a field shift pulse of 0V to 15V is applied, and the charges are transferred in the vertical transfer CCD 321. At this time, a vertical transfer pulse of −7V to 0V is applied to the vertical transfer CCD 312. The charges are transferred in a horizontal transfer CCD 314. At this time, a horizontal transfer pulse of 0V to 5V is applied to the horizontal transfer CCD 314. An output is obtained from the output transistor of a charge reading unit. The charges are reset by a reset transistor 317 every pixel. By these operations, a dc voltage of 15V is applied. In addition, in an electronic shutter mode, the accumulated charges are swept from the photodiode 311 to a substrate lower portion 313. At this time, a high-voltage pulse of 25V is applied.

In a CCD image pickup element 330 incorporating a power supply according to Example 9, in a space in which the above parts are not arranged, dc-to-dc converters 321, 324, 327, operated by an input voltage of 5V, for respectively generating voltages of 15V, −7V, and 25V are incorporated. These dc converters have planar inductors 322, 325, and 328 and control circuits 323, 326, and 329, respectively, to cope with various output voltages.

As a boost dc-to-dc converter, the dc-to-dc converter shown in FIG. 53 is used. Note that, in a −7-V booster (not shown), a rectifier diode 263 is arranged to reversely set its polarities, and the position of a planar inductor 261 and the position of a switching transistor 262 are reversed. As a planar inductor, for example, the planar inductor shown in FIG. 55 or FIG. 9 is used.

Note that a solid-state image pickup element used in Example 9 is not limited to a CCD image pickup element. For example, the arrangement of Example 9 can be applied to a solid-state image pickup element such as an MOS image pickup element in which a high voltage except for a voltage of 5 V is required.

As described above, according to Example 9, a power supply having a planar inductor is incorporated in a CCD solid-state image pickup element so that the CCD solid-state image pickup element can be operated by a single power supply, thereby simplifying the power supply unit of a video camera or electronic still camera. Therefore, a video camera or electronic still camera can be more downsized thereby decreasing costs.

What is claimed is:

1. A magnetic element for use in a power supply, comprising:

a planar inductor comprising a planar coil, insulating layers disposed on opposed surfaces of the planar coil and soft magnetic layers disposed on outer surfaces of the insulating layers; and auxiliary planar coils disposed on outer surfaces of said soft magnetic layers, wherein said auxiliary planar coils generate a magnetic field so as to reduce a dc magnetic field generated by a dc current flowing through said planar coil.

2. The magnetic element according to claim 1, wherein a dc current flowing through the auxiliary planar coils is substantially proportional to a dc current flowing through said planar coil.

3. A magnetic element for use in a power supply, comprising:

a planar transformer comprising a planar primary coil and a planar secondary coil provided with coil insulating layers disposed on the surfaces of the planar primary and secondary coils, an insulating layer separating the planar primary and secondary coils, and soft magnetic layers disposed on the outer surfaces of the coil insulating layers; and auxiliary planar coils disposed on the outer surfaces of said soft magnetic layers, wherein said auxiliary planar coils generate a magnetic field so as to reduce a dc magnetic field generated by a dc current flowing through said planar primary and secondary coils.

4. The magnetic element according to claim 3, wherein a dc current flowing through the auxiliary planar coils is substantially proportional to a dc current flowing through said planar primary and secondary coils.

5. A dc-to-dc converter comprising:

a switching means for generating a rectangular wave from an input signal;

a means for modulating a pulse width of the rectangular wave generated by the switching means;

a planar inductor comprising a planar coil, insulating layers disposed on opposed surfaces of the planar coil and soft magnetic layers disposed on outer surfaces of the insulating layers, said planar coil coupled to said switching means and accumulating electromagnetic energy during a switching ON state and releasing accumulated electromagnetic energy during a switching OFF state of the switching means, a capacitor for smoothing the wave generated by the switching means;

a rectifying element; and auxiliary planar coils disposed on outer surfaces of said soft magnetic layers constituting said planar inductor, wherein said auxiliary planar coils generate a magnetic field so as to reduce a dc magnetic field generated by a dc current flowing through said planar coil.

6. The dc-to-dc converter according to claim 5, wherein a dc current flowing through the auxiliary planar coils is substantially proportional to a dc current flowing through said planar coil.

7. A dc-to-dc converter comprising:

a switching means for generating a rectangular wave from an input signal;

a means for modulating a pulse width of the rectangular wave generated by the switching means;

a planar transformer comprising a planar primary coil and a planar secondary coil provided with coil insulating layers disposed on surfaces of the planar primary and secondary coils, an insulating layer separating the planar primary and secondary coils, and soft magnetic layers disposed on outer surfaces of the coil insulating layers, said planar transformer coupled to said switching means and accumulating electromagnetic energy in the planar primary coil during a switching ON state and releasing the accumulated electromagnetic energy via the planar secondary coil during a switching OFF state of the switching means;

a capacitor for smoothing the wave generated by the switching means;

a rectifying element; and auxiliary planar coils disposed on outer surfaces of said soft magnetic layers constituting said planar transformer, wherein said auxiliary planar coils generate a magnetic field so as to reduce a dc magnetic field generated by a dc current flowing through said planar primary and secondary coils.

8. The dc-to-dc converter according to claim 7, wherein a dc current flowing through the auxiliary planar coils is substantially proportional to a dc current flowing through said planar primary and secondary coils.

* * * * *